(12) United States Patent
Azegami et al.

(10) Patent No.: US 8,628,281 B2
(45) Date of Patent: Jan. 14, 2014

(54) EXCHANGEABLE CUTTING HEAD AND CUTTING TOOL HAVING THE SAME

(75) Inventors: Takayuki Azegami, Akashi (JP); Yoshihiko Kimura, Akashi (JP)

(73) Assignee: Mitsubishi Materials Corporation, Tokyo (JP)

( * ) Notice: Subject to any disclaimer, the term of this patent is extended or adjusted under 35 U.S.C. 154(b) by 964 days.

(21) Appl. No.: 12/659,961

(22) Filed: Mar. 26, 2010

(65) Prior Publication Data

US 2010/0247263 A1    Sep. 30, 2010

(30) Foreign Application Priority Data

Mar. 27, 2009 (JP) ................. 2009-079852
Dec. 17, 2009 (JP) ................. 2009-286638

(51) Int. Cl.
   *B23C 5/20*   (2006.01)
   *B23C 5/26*   (2006.01)

(52) U.S. Cl.
   USPC .......................................... 409/234; 407/66

(58) Field of Classification Search
   USPC ............ 409/234; 407/66, 40, 11, 34, 131, 42, 407/30, 33
   See application file for complete search history.

(56) References Cited

U.S. PATENT DOCUMENTS

| 4,530,527 | A | * | 7/1985 | Holmberg ................. 285/382.4 |
| 5,899,642 | A | * | 5/1999 | Berglow et al. ................. 407/40 |
| 2002/0081164 | A1 | | 6/2002 | Pokolm |
| 2002/0131819 | A1 | | 9/2002 | Kress et al. |
| 2010/0143051 | A1 | | 6/2010 | Lutfi |

FOREIGN PATENT DOCUMENTS

| CN | 2180372 Y | 10/1994 |
| CN | 2527382 Y | 12/2002 |
| CN | 2649285 Y | 10/2004 |
| EP | 1 972 399 A1 | 9/2008 |

(Continued)

OTHER PUBLICATIONS

European Search Report dated Jul. 14, 2010 and Annex to the European Search Report on European Patent Application No. EP 10 15 7943.

(Continued)

*Primary Examiner* — John C Hong
(74) *Attorney, Agent, or Firm* — Edwards Wildman Palmer LLP

(57) ABSTRACT

An exchangeable cutting head that is inserted into a mounting hole formed on a tool body, screwed on a mounting screw section provided on a bottom portion of the mounting hole, and is attached removably to the tool body, the exchangeable cutting head includes: a cutting head body including: a cutting portion provided at a front-end section; a mounting portion provided at a rear-end section and inserted into the mounting hole; and an engaging hole having an inner-peripheral face on which a recessed portion is formed, the cutting head body being made of a hard material; and a connection member including: a shaft portion that is inserted into the engaging hole, includes an outer periphery attached firmly to the inner-peripheral face of the engaging hole, and is engaged with the inner-peripheral face; a head screw section screwed with the mounting screw section; and a hole section formed inside of the head screw section and the shaft portion and along a center line of the shaft portion, the connection member being made of a metal material having a degree of hardness lower than a degree of hardness of the hard material and the connection member being connected to the cutting head body.

13 Claims, 12 Drawing Sheets

(56) References Cited

FOREIGN PATENT DOCUMENTS

| | | |
|---|---|---|
| GB | 2 108 228 A | 5/1983 |
| JP | 07-164234 A | 6/1995 |
| JP | 2004-098272 A | 4/2004 |
| WO | WO-98/13161 A1 | 4/1998 |

OTHER PUBLICATIONS

Chinese Office Action issued on Jul. 25, 2013 for corresponding Chinese patent application No. 201010141460.8.

* cited by examiner

EXCHANGEABLE CUTTING HEAD AND CUTTING TOOL HAVING THE SAME

BACKGROUND OF THE INVENTION

1. Field of the Invention

The present invention relates to a cutting tool in which an exchangeable cutting head having a cutting portion is attached removably to a tool body.

This application is based on and claims priority from Japanese Patent Application No. 2009-079852, filed on Mar. 27, 2009 and Japanese Patent Application No. 2009-286638, filed on Dec. 17, 2009, the contents of which are incorporated herein by reference.

2. Background Art

Conventionally, a cutting tool in which an exchangeable cutting head is attached removably to a tool body is known.

In the cutting tool having the exchangeable cutting head, the exchangeable cutting head includes a cutting head body having a cutting portion and a connection member that is provided at a rear-end of the cutting head body and has a head screw section.

In addition, the tool body has a mounting hole formed at the tool body and a female screw section formed at the mounting hole.

In the foregoing cutting tool having the exchangeable cutting head, the exchangeable cutting head is inserted into the mounting hole of the tool body, and the head screw section of the connection member is screwed into the female screw section of the mounting hole of the tool body.

As an example, a cutting head body and a connection member are formed so as to be integrated in one body in a powder metallurgy process, and an exchangeable cutting head made of a hard material is disclosed in Japanese Unexamined Patent Application, First Publication No. H07-164234.

In the structure, a head screw section of the above-described connection member is screwed into a female screw section formed at a mounting hole of a tool body, and the cutting head body is thereby detachably attached to the tool body.

In addition, as an example, an exchangeable cutting head in which a cutting head body and a connection member are removably coupled each other is disclosed in Japanese Unexamined Patent Application, First Publication No. 2004-98272.

In the structure, in a state where the cutting head body is connected with the connection member, a head screw section of the connection member and a female screw section formed at a mounting hole of a tool body are screwed together, and the exchangeable cutting head is attached removably to the tool body.

In a method for connecting the cutting head body with the connection member, an end portion of a hook section is formed at one of the cutting head body and the connection member, a hook hole of the hook section is formed at the other of the cutting head body and the connection member, the end portion is inserted into and passed through the hook hole.

Subsequently, the cutting head body is rotated in relative to the connection member in a circumferential direction, the cutting head body is connected with the connection member.

In the above-described cutting tool having the exchangeable cutting head, it is preferable that the cutting head body be made of a hard material in order to improve sharpness or abrasion resistance in a machining process.

On the other hand, when the head screw section of the connection member is screwed in the tool body, since stress is generated at a screw thread, it is preferable that the head screw section of the cutting head be made of a material with a high level of toughness.

However, in the above-described exchangeable cutting head used in the cutting tool having the exchangeable cutting head disclosed in Japanese Unexamined Patent Application, First Publication No. H07-164234, the cutting head body and the connection member are formed of a hard material so as to be integrated in one body, and there is a drawback in that a screw thread thereof is easily fractured when stress occurs at the head screw section.

In addition, due to concentrated stress at a root portion of the screw, there is a drawback in that the screw may break.

In order to avoid the foregoing drawback, it is necessary to machine each screw thread in a particular form to spread stress generated in the screw thread, therefore a manufacturing cost increases.

In addition, in the exchangeable cutting head of the cutting tool having the exchangeable cutting head disclosed in Japanese Unexamined Patent Application, First Publication No. 2004-98272, since the cutting head body can be separated from the connection member, it is possible to form each of the cutting head body and the connection member by use of a different material.

However, a configuration of the hook section or the hook hole is complicated, and a manufacturing cost for molding the hook section or the hook hole increases.

In addition, in a step for attaching the cutting head body to the tool body, it is necessary to initially combine the cutting head body with the connection member, and there is a problem in that an hour of labor is required.

SUMMARY OF THE INVENTION

The present invention was made in order to solve the above problems, and has an object to provide an exchangeable cutting head in which it is possible to easily and reliably connect the cutting head body with the connection member and reduce a cost of manufacturing thereof.

In order to solve the above-described problems, an exchangeable cutting head of a first aspect of the present invention is inserted into a mounting hole formed on a tool body, is screwed on a mounting screw section provided on a bottom portion of the mounting hole, and is attached removably to the tool body. The exchangeable cutting head includes a cutting head body and a connection member. The cutting head body includes: a cutting portion provided at a front-end section; a mounting portion provided at a rear-end section and inserted into the mounting hole; and an engaging hole having an inner-peripheral face on which a recessed portion is formed, the cutting head body being made of a hard material. The connection member includes: a shaft portion that is inserted into the engaging hole, includes an outer periphery (outer-peripheral section) attached firmly to the inner-peripheral face of the engaging hole, and is engaged with the inner-peripheral face; a head screw section screwed with the mounting screw section; and a hole section formed inside of the head screw section and the shaft portion and along a center line of the shaft portion, the connection member being made of a metal material having a degree of hardness lower than the degree of hardness of the hard material and the connection member being connected to the cutting head body.

In the exchangeable cutting head including the foregoing structure, an individual cutting head body and an individual connection member are used, and they are connected to each other. For this reason, it is possible to form the cutting head body including the cutting portion used for cutting a work piece, from, for example, a hard material such as cemented carbide, and to form the connection member from, for example, a plastically-deformable material with a high degree of toughness such as stainless steel. Therefore, it is possible to easily form the connection member including the head screw section on which a screw is formed by a machining process at a low cost while maintaining a high level of sharpness or durability in the cutting portion of the cutting head body. In addition, it is possible to solve a problem in that a screw of the head screw section is easily cracked.

In addition, in the connection structure constituted of the cutting head body and the connection member, the outer periphery of the shaft portion protrudes in a state where the shaft portion of the connection member is inserted into the engaging hole of the cutting head body, the outer periphery is fitted into the recessed portion formed at the inner-peripheral face of the engaging hole, and the cutting head body is engaged with the connection member. Therefore, it is possible to easily connect the cutting head body with the connection member.

In the connection structure constituted of the cutting head body and the connection member as described above, for example, by pressing a rod member into the hole section of the connection member in a state where the shaft portion of the connection member is inserted into the engaging hole of the cutting head body, the connection member is plastically-deformed so that the diameter of the shaft portion of the connection member increases.

In this manner, since the outer periphery of the shaft portion is attached firmly to the inner-peripheral face of the engaging hole, it is possible to reliably connect the cutting head body with the connection member.

In addition, since a simple structure in which the engaging hole is formed in the cutting head body and the shaft portion and the hole section are formed in the connection member is employed, it is possible to easily connect the cutting head body with the connection member.

Consequently, when the exchangeable cutting head is manufactured, it is not necessary to perform a complicated machining process, and it is possible to reduce a cost of manufacturing.

Furthermore, since the connection member can be inexpensively manufactured in a high-volume production by use of a automatic lathe or the like including a barfeeder, it is thereby possible to further reduce the cost of manufacturing the exchangeable cutting head.

In addition, it is preferable that, in the exchangeable cutting head of the first aspect of the present invention, the recessed portion be an uneven face in which the surface roughness in maximum height (maximum height of roughness profile) Rz is 5 μm to 200 μm, the outer periphery of the shaft portion be attached firmly to the inner-peripheral face of the engaging hole, and part of the outer periphery be plastically-deformed along the uneven face.

Also, in the exchangeable cutting head including the foregoing structure, an individual cutting head body and an individual connection member are used, and they are connected to each other. For this reason, it is possible to form the cutting head body including the cutting portion used for cutting a work piece, from, for example, a hard material such as cemented carbide, and to form the connection member from, for example, a plastically-deformable material with a high degree of toughness such as stainless steel. Therefore, it is possible to easily form the connection member including the head screw section on which a screw is formed by a machining process at a low cost while maintaining a high level of sharpness or durability in the cutting portion of the cutting head body. In addition, it is possible to solve a problem in that a screw of the head screw section is easily cracked.

In addition, in the case where the surface roughness in maximum height Rz is less than 5 μm, the condition of the inner-peripheral face is smooth, and the connection member is easily removed from the cutting head body.

In addition, in the case where the surface roughness in maximum height Rz is less than or equal to 200 μm, it is easy to insert the shaft portion into the cutting head body.

Therefore, it is preferable that the surface roughness in maximum height Rz of the uneven face formed on the inner-peripheral face be greater than or equal to 5 μm and be less than or equal to 200 μm.

In addition, in the connection structure constituted of the cutting head body and the connection member, the outer periphery of the shaft portion is plastically-deformed along the uneven face formed on the inner-peripheral face of the engaging hole in a state where the shaft portion of the connection member is inserted into the engaging hole of the cutting head body. Therefore, it is possible to easily and reliably connect the cutting head body with the connection member.

In the connection structure constituted of the cutting head body and the connection member as described above, for example, by pressing a rod member into the hole section of the connection member in a state where the shaft portion of the connection member is inserted into the engaging hole of the cutting head body, the connection member is plastically-deformed so that the diameter of the shaft portion of the connection member increases.

In addition, since a simple structure in which the engaging hole is formed in the cutting head body and the shaft portion and the hole section are formed in the connection member is employed, it is possible to easily connect the cutting head body with the connection member.

Consequently, when the exchangeable cutting head is manufactured, it is not necessary to perform a complicated machining process, and it is possible to reduce the cost of manufacturing.

Furthermore, since the connection member can be inexpensively manufactured in high-volume by use of an automatic lathe or the like which is provided with a barfeeder, it is thereby possible to further reduce the cost of manufacturing the exchangeable cutting head.

In addition, it is preferable that, in the exchangeable cutting head of the first aspect of the present invention, at least one of a wall section that faces the front-end section and a wall section that faces in a circumferential direction around the center line be formed at the recessed portion.

In the foregoing exchangeable cutting head, in the case where the wall section facing the front-end section in a center line direction is formed at the recessed portion, the outer periphery of the shaft portion of the connection member is the fitted into the recessed portion, and the recessed portion is engaged with the outer periphery. As a result, it is possible to prevent the connection member from being separated from the cutting head body in the center line direction toward the rear-end section, and from being moved relative to the cutting head body. That is, it is possible to prevent the connection member from being removed from the cutting head body.

In addition, in the case where the wall section facing in a circumferential direction around the center line is formed at the recessed portion, the outer periphery of the shaft portion of the connection member is fitted into the recessed portion, and the recessed portion is engaged with the outer periphery. As a result, it is possible to prevent the connection member from being rotated relative to the cutting head body around the center line. In the cutting head body, it is possible to prevent the connection member from being rotated.

Therefore, it is possible to reliably connect the cutting head body with the connection member.

In addition, it is preferable that, in the exchangeable cutting head of the first aspect of the present invention, a planar wall face extending in the center line direction be formed at the engaging hole, and the wall face be the wall section that faces in a circumferential direction around the center line in the recessed portion.

In the foregoing exchangeable cutting head, when the outer periphery of the shaft portion of the connection member is fitted into the recessed portion, since the shaft portion is planarly plastically-deformed so as to be in close contact with the wall face, it is possible to prevent the connection member from being rotated relative to the cutting head body around the center line. Therefore, it is possible to further reliably connect the cutting head body with the connection member.

In addition, it is preferable that, in the exchangeable cutting head of the first aspect of the present invention, the mounting portion have an outer-peripheral face, the mounting hole of the tool body be a tapered hole, and the outer-peripheral face be tapered such that an external diameter thereof gradually decreases toward the rear-end section and has a taper surface into which the tapered hole is fitted.

In the foregoing exchangeable cutting head, the outer-peripheral face of the mounting portion which is the taper surface of the cutting head body is evenly and uniformly pressed onto an inner-peripheral face of the tapered hole of the mounting hole, and both thereof are fitted (engaged) with each other so as to form a tapered structure. Because of this, it is possible to further tightly attach the cutting head body to the tool body, perfectly coincide the center line of the cutting head body with the center line of the tool body, and perform a centering thereof.

In addition, high pressure is generated between the outer-peripheral face of the mounting portion and the tapered hole, due to a wedge effect in that the outer-peripheral face of the mounting portion which is the taper surface is fitted onto the tapered hole of the mounting hole so as to form a tapered structure. High friction resistance is generated by the pressure, and it is thereby possible to tightly combine the cutting head body with the tool body in an integrated manner.

In addition, since the friction resistance is generated, all of the tightening torque generated between the cutting head body and the mounting portion is avoided from being applied to the head screw section and the mounting screw section.

For this reason, an excessive axial tension is prevented from being generated between the head screw section and the mounting screw section, it is possible to prevent the head screw section and the mounting screw section from being fractured, and prevent the connection member from being removed from the cutting head body.

Furthermore, in a state where the exchangeable cutting head is attached to the tool body, an axial tension applied to the head screw section and the mounting screw section is relieved. Therefore, even if the cutting head body is not connected with the connection member tighter than necessary, the connection member is not removed from the cutting head body. Thus, in a state where the exchangeable cutting head is removed from the tool body, it is possible to easily separate the connection member from the cutting head body.

In addition, it is preferable that, in the exchangeable cutting head of the first aspect of the present invention, an inclined angle of the taper surface relative to the center line be set in the range of 1° to 20°.

Furthermore, it is preferable that, in this range, the inclined angle be set in the range of 2° to 20°.

By means of this structure, a tapered portion of the cutting head body is tightly and reliably fitted into (engaged with) the tapered hole of the mounting hole. In addition, it is possible to remove the cutting head from the mounting hole.

Specifically, it is further preferable that the above-described inclined angle be set in the range of 3° to 5°.

In addition, it is preferable that, in the exchangeable cutting head of the first aspect of the present invention, the hole section be a through hole penetrating the connection member along the center line, and the cutting head body have a coolant hole that is communicated with the through hole and opens at the cutting portion.

In the foregoing structure, it is possible to cause a coolant supplied from the tool body to be passed through the through hole and the coolant hole, and supply the coolant to the cutting portion.

In addition, it is preferable that, in the exchangeable cutting head of the first aspect of the present invention, the cutting head body include a rotation section having at least a pair of parallel faces that are parallel to each other relative to the center line.

In the foregoing structure, it is possible to engage a tool such as a wrench with the rotation section, and rotate the cutting head body. In this way, it is possible to tightly hold the cutting head body and the connection member onto the tool body.

In addition, it is preferable that, in the exchangeable cutting head of the first aspect of the present invention, the rotation section have a rear-end, and a flange that protrudes a radial-outer direction around the center line be provided at the rear-end of the rotation section.

In the foregoing structure, for example, by attaching a jig onto the flange, it is possible to tightly fix the cutting head body in the center line direction. In addition, at this time, by supporting the rotation section by use of the jig, it is possible to stably fix the cutting head body.

In this way, it is possible to easily connect the cutting head body with the connection member, and easily separate the connection member from the cutting head body. In addition, when the cutting portion is re-polished or coated by use of a PVD method, it is possible to reliably support the cutting head body.

In addition, it is preferable that, in the exchangeable cutting head of the first aspect of the present invention, the mounting portion have a rear-end, and the engaging hole extend from the rear-end of the mounting portion to the inside of the cutting portion.

By means of this structure, since it is possible to reduce the weight of the cutting head body, it is possible to prevent vibration from being generated in the cutting portion during a machining process.

In addition, it is preferable that, in the exchangeable cutting head of the first aspect of the present invention, the cutting head body be molded by use of any material of cemented carbide, cermet, and ceramic.

Since the cutting head body having the cutting portion used for cutting a work piece is formed from cemented carbide as described above, it is possible to maintain a high level of sharpness or durability in the cutting portion of the cutting head body. That is, an amount of abrasion is reduced, and it is possible to maintain a high level of durability.

In order to solve the above-described problems, a cutting tool having an exchangeable cutting head of a second aspect of the present invention includes: a tool body; and the above-described exchangeable cutting head that is attached to the tool body.

According to the foregoing cutting tool having the exchangeable cutting head, since the above-described exchangeable cutting head in which the cutting head body is reliably connected with the connection member is fixed into the cutting tool having the exchangeable cutting head, it is possible to prevent vibration from being generated therein during a machining process and perform a machining process with a high level of precision.

According to the cutting tool having the exchangeable cutting head related to the present invention, in the connection structure constituted of the cutting head body and the connection member, the outer periphery of the shaft portion of the connection member protrudes toward the recessed portion formed on the engaging hole of the cutting head body, the outer periphery fitted into and engaged with the recessed portion.

Consequently, it is possible to easily connect the cutting head body with the connection member.

In addition, since the connection structure constituted of the foregoing cutting head body and the connection member is obtained by providing a simplified structure, it is possible to reduce the cost of manufacturing.

DESCRIPTION OF THE PREFERRED EMBODIMENTS

First Embodiment

Hereinafter, a first embodiment of the present invention will be described with reference to drawings.

In the explanation below, a position which is close to the front-end position is referred to as "a front-end side (front-end section)" in a direction from a rear-end position to toward a front-end position. In this case, a rear-end face 15 (described below) of a tool body 10 is formed at the rear-end position, and a cutting edge 23B (described below) is formed at the front-end position.

In addition, a position which is close to the rear-end position is referred to as "rear-end side (rear-end, rear-end section)" in a direction from the front-end position toward the rear-end position.

Figure 1:
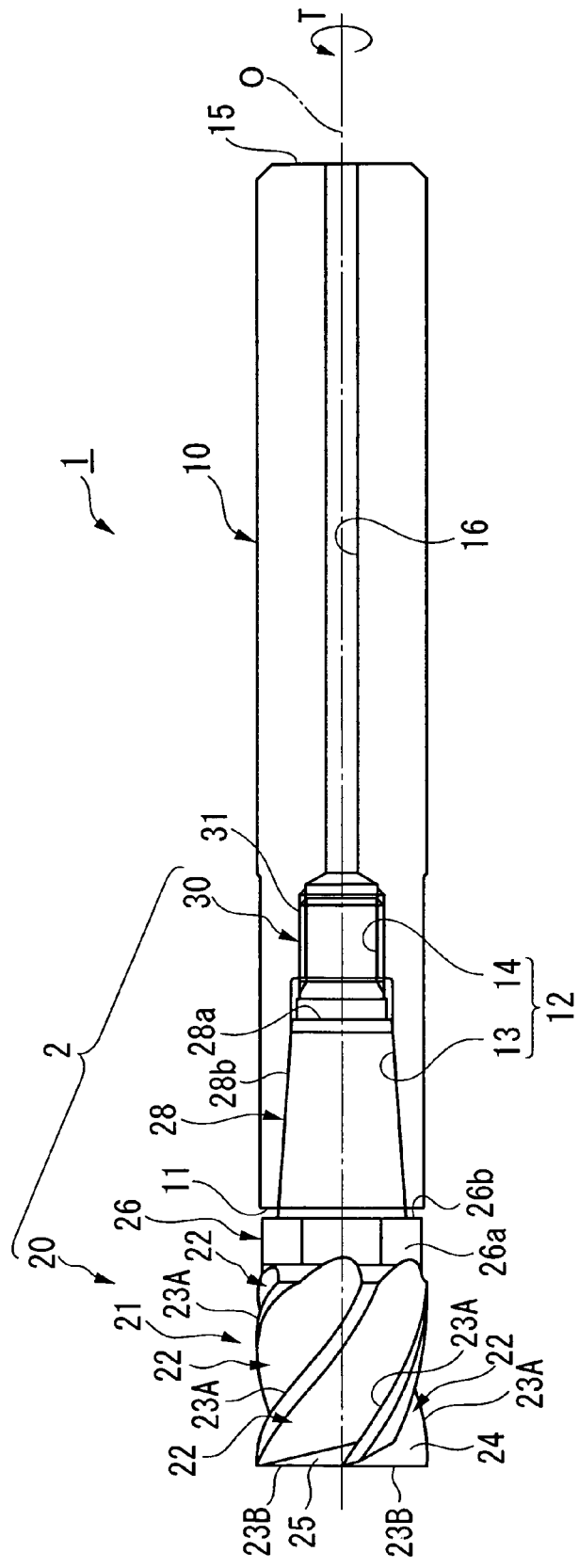
FIG. 1 is a side view showing a cutting tool having an exchangeable cutting head related to a first embodiment, and a cross-sectional view showing a portion of the cutting tool.

As shown in FIG. 1, a cutting tool 1 having an exchangeable cutting head of a first embodiment is constituted of a tool body 10 and an exchangeable cutting head 2.

The tool body 10 rotates around a center line O.

The exchangeable cutting head 2 is constituted of a cutting head body 20 and a connection member 30. The cutting head body 20 is fixed to and attached removably to the tool body 10. The connection member 30 is used for attaching the cutting head body 20 to the tool body 10.

The tool body 10 is formed of, for example, steel or the like. The tool body 10 is formed substantially as a circular cylinder around the center line O.

In the tool body 10, a mounting hole 12 is formed in a direction from a front-end face 11 toward the rear-end face 15 around the center line O.

The mounting hole 12 has a tapered hole 13 and a mounting screw section.

The tapered hole 13 is a hole formed substantially as a circular truncated cone in which the internal diameter of the hole gradually decreases with a constant gradient in a direction from the front-end face 11 of the tool body 10 toward the rear-end face 15.

The mounting screw section 14 is provided at a bottom portion of the mounting hole 12, aligned with a rear-end of tapered hole 13, and has a female screw formed at an inner-peripheral face.

In addition, a coolant supply hole 16 is formed at a rear-end of the mounting screw section 14.

The coolant supply hole 16 has the diameter that is smaller than the diameter of the mounting screw section 14 by a step-difference, extends along the center line O, and opens at the rear-end face 15 of the tool body 10.

In addition, in the embodiment, an inclined angle the above-described tapered hole 13 relative to the center line O is set in the range of 1° to 20°, and it is preferable that, in this range, the angle be set in the range of 2° to 20°. Furthermore, it is preferable that the angle be set in the range of 3° to 5°. In addition, an optimal angle of the inclined angle is approximately 4°.

Figure 2:
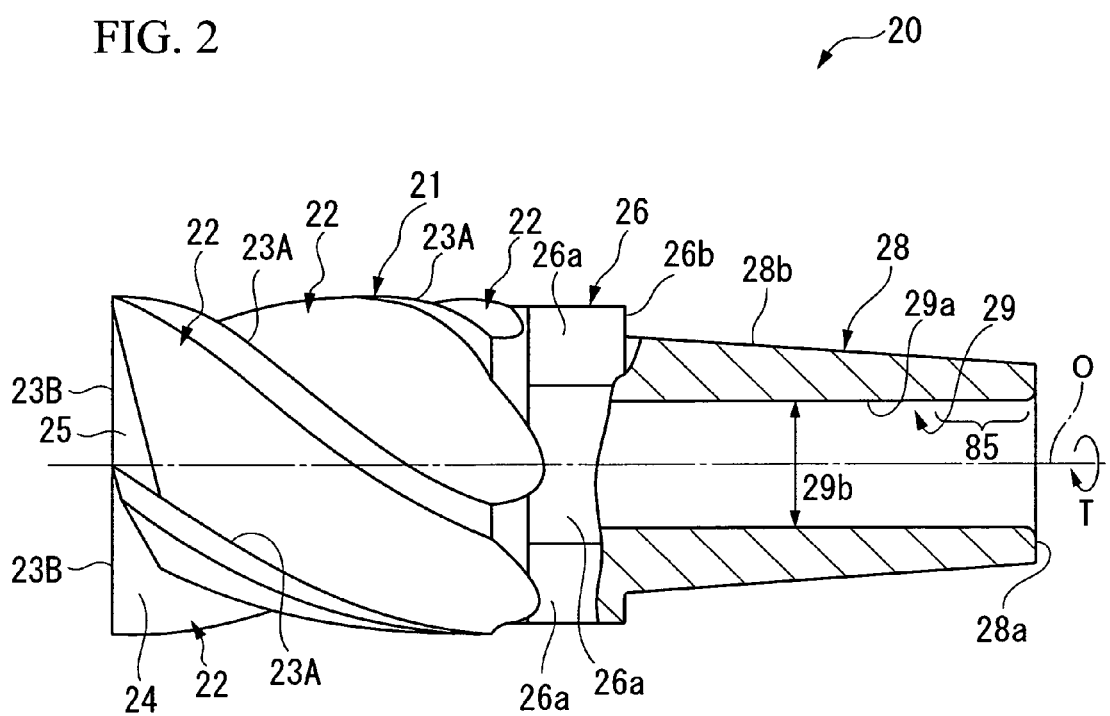
FIG. 2 is a side view showing a cutting head body related to the first embodiment, and a cross-sectional view showing a portion of the cutting head body.

The cutting head body 20 is made of a hard material such as cemented carbide, cermet, ceramic. As shown in FIG. 2, the cutting head body 20 includes a cutting portion 21 that machines a work material, and a mounting portion 28 aligned with a rear-end of the cutting portion 21. The center of the cutting head body 20 is coincided with the center line O.

In the cutting head body 20, the cutting portion 21 is provided at a front-end section, and the mounting portion 28 is provided at a rear-end section.

In addition, an outer-peripheral face of the mounting portion 28 is a taper surface 28b in which the external diameter of the taper surface 28b gradually decreases with a constant gradient in a direction from the front-end section toward the rear-end.

Therefore, the mounting portion 28 is formed substantially as a circular truncated cone.

In addition, in the embodiment, an inclined angle of the taper surface 28b of the above-described mounting portion 28 relative to the center line O is substantially equal to the inclined angle of the above-described tapered hole 13 relative to the center line O.

That is, the inclined angle is set in the range of 1° to 20°.

Here, the cutting portion 21 of the cutting head body 20 will be described in detail.

A plurality of flutes 22 are formed at the cutting portion 21. Each of the flutes 22 is positioned in a circumferential direction related to the center line O so as to be twisted in the center line O toward a rear-end side and in a backward direction of a tool rotation direction T.

In a plurality of the flutes 22, a portion of the front-end side of a wall face that faces in a forward direction of the tool rotation direction T is a rake face 24.

An outer-peripheral cutting edge 23A is formed at a ridge line portion that is positioned at an outer-peripheral side of the rake face 24.

In addition, a cutting edge 23B is formed in an intersect ridge line portion in which the rake face 24 is intersected with and a tip flank face 25. The cutting edge 23B is a cutting point (tip) of the cutting head body 20 and extends from an adjacent center line O toward an outer-peripheral side.

In addition, in the cutting portion 21, a wrench engagement section 26 (rotation section) is formed at a position which is closer to the rear-end than the position at which a plurality of outer-peripheral cutting edges 23A is formed.

The wrench engagement section 26 is formed substantially as a circle in a cross section orthogonal to the center line O.

A portion of the wrench engagement section 26 that is positioned on an outer-peripheral face is machined in a direction parallel to the center line O and in a direction from the outer-peripheral face to the center line O by a predetermined depth.

Consequently, at least a pair of parallel faces 26a (notched face) is formed on the outer-peripheral face of the wrench engagement section 26 and at positions that are opposite to each other. The parallel faces 26a are symmetrically positioned relative to the center line O.

In the embodiment, three pair of the foregoing pair of parallel faces 26a is formed on the outer-peripheral face of the wrench engagement section 26. Therefore, the wrench engagement section 26 is formed substantially as a hexagon in a cross section orthogonal to the center line O.

In addition, the wrench engagement section 26 includes a support face 26b. The support face 26b forms a step-difference between the wrench engagement section 26 and the mounting portion 28. The support face 26b faces the rear-end side and is a flat face orthogonal to the center line O.

An engaging hole 29 is formed inside of the mounting portion 28 of the cutting head body 20. The engaging hole 29 opens at a rear-end face 28a of the mounting portion 28 and extends along the center line O.

The rear-end face 28a is a flat face orthogonal to the center line O.

The engaging hole 29 has an inner-peripheral face 29a that is formed substantially as a circular cylinder. The engaging hole 29 has an internal diameter 29b.

Figure 3:
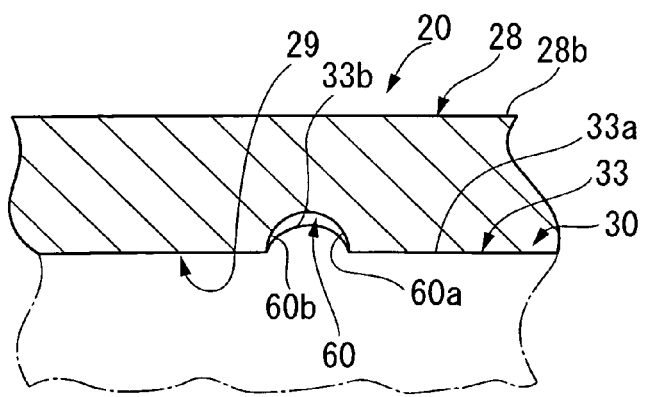
FIG. 3 is a cross-sectional view showing a portion of the cutting head body related to the first embodiment, and showing a state where an outer-peripheral face of a connection section of a connection member is attached firmly to an inner-peripheral face of an engaging hole when a toroidal groove is formed on the engaging hole of the cutting head body.

As shown in FIG. 3, a toroidal groove 60 (recessed portion) is formed at the inner-peripheral face 29a.

The toroidal groove 60 is a depressed portion in a radial-outer direction with respect to the engaging hole 29 and formed as a ring around the center line O.

The toroidal groove 60 includes a wall section 60a (first wall section) facing the front-end side toward the center line O, and a wall section 60b (second wall section) facing the rear-end toward the center line O.

In addition, the structure in which single toroidal groove 60 is formed is shown in FIG. 3; however, a plurality of toroidal grooves 60 may be formed on the engaging hole 29.

In addition, the coolant hole (not shown in drawings) that is formed inside of the cutting portion 21 of the cutting head body 20 is connected to a portion positioned at the front-end side of the engaging hole 29.

The coolant hole is communicated with each flute 22.

The connection member 30 is made of a plastically-deformable metal material having a degree of hardness lower than the degree of hardness of the hard material such as cemented carbide that forms the cutting head body 20. The connection member 30 is made of a material, for example, stainless steel having a high level of toughness.

Figure 4:
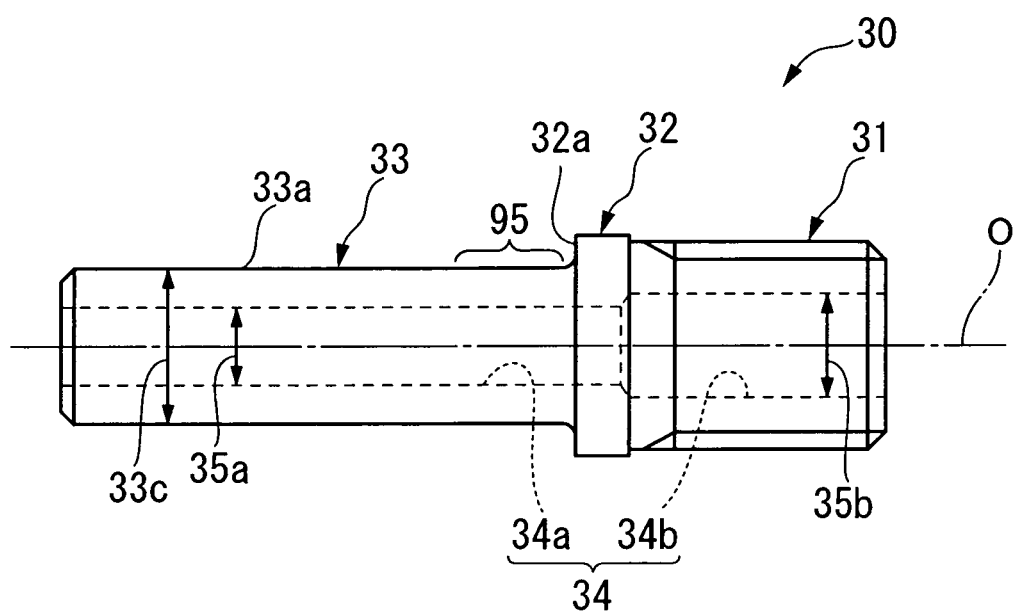
FIG. 4 is a side view showing a connection member related to the first embodiment.

As shown in FIG. 4, the connection member 30 is formed substantially as a multiple-stage circular cylinder along the center line O.

A head screw section 31 is provided at a rear-end section of the connection member 30. The head screw section 31 has an outer-peripheral face on which a male screw is formed.

In addition, in connection member 30, a flange section 32 is provided at a portion of the front-end side of the head screw section 31. The flange section 32 has a diameter that is greater than the external diameter of the shaft portion 33 by a step-difference.

The flange section 32 is formed as a circle in a cross section orthogonal to the center line O.

A face of the flange section 32 facing the front-end side is a flat face orthogonal to the center line O and is a contact face 32a.

Furthermore, a shaft portion 33 is provided at the front-end side of the above-described flange section 32, and the shaft portion 33 extends along the center line O from the contact face 32a toward the front-end side.

An outer periphery 33a of the shaft portion 33 has a face formed as a circular cylinder around the center line O.

In a state where before the above-described cutting head body 20 is connected with the connection member 30, an external diameter 33c of the outer periphery 33a is smaller than the flange section 32 and is slightly smaller than the internal diameter 29b of the inner-peripheral face 29a of the engaging hole 29 in the above-described cutting head body 20.

In this state, the external diameter 33c of the outer periphery 33a is smaller than the internal diameter 29b of the inner-peripheral face 29a of the engaging hole 29, for example, by 0.1 mm to 0.5 mm.

In addition, a through hole 34 (hole section) is formed in the connection member 30. The through hole 34 opens at the rear-end of the head screw section 31, extends along the center line O, opens at a front-end (front-end side) of the shaft portion 33 and penetrates the connection member 30.

In the embodiment, the through hole 34 includes a small-diameter hole 34*a* and a large-diameter hole 34*b*.

The small-diameter hole 34*a* is formed inside of the flange section 32 and the shaft portion 33 and has a constant internal diameter 35*a* along the length.

The large-diameter hole 34*b* is formed inside of the head screw section 31, and has the internal diameter 35*b* greater than that of the small-diameter hole 34*a*.

The internal diameter 29*b* of the inner-peripheral face 29*a* and the external diameter 33*c* of the outer periphery 33*a* are determined depending on an amount of torque that is applied to the exchangeable cutting head 2.

If, for example, the amount of torque applied to the exchangeable cutting head 2 is large, it is necessary to increase the internal diameter 29*b* and the external diameter 33*c* in order to reliably transmit the torque of the cutting tool 1 to the cutting portion 21.

The internal diameter 35*a* of the small-diameter hole 34*a* and the internal diameter 35*b* of the large-diameter hole 34*b* are determined depending on a diameter of a large-diameter portion 50*a* of a press member 50 as described below.

Specifically, the internal diameter 35*b* of the large-diameter hole 34*b* is greater than the diameter of the large-diameter portion 50*a* of the press member 50.

Therefore, when the press member 50 is inserted into the connection member 30, the large-diameter portion 50*a* reaches an entrance between the small-diameter hole 34*a* and the large-diameter hole 34*b*.

In addition, the internal diameter 35*a* of the small-diameter hole 34*a* is smaller than the diameter of the large-diameter portion 50*a* of the press member 50.

Therefore, as described below, when the press member 50 is pressed into the small-diameter hole 34*a*, the internal diameter 35*a* of the small-diameter hole 34*a* increases, the external diameter 33*c* of the outer periphery 33*a* increases, and the outer periphery 33*a* of the shaft portion 33 is attached firmly to the inner-peripheral face 29*a* of the engaging hole 29.

Next, a method for assembling the exchangeable cutting head 2 by coupling the above-described cutting head body 20 with the connection member 30 will be described.

Figure 5:
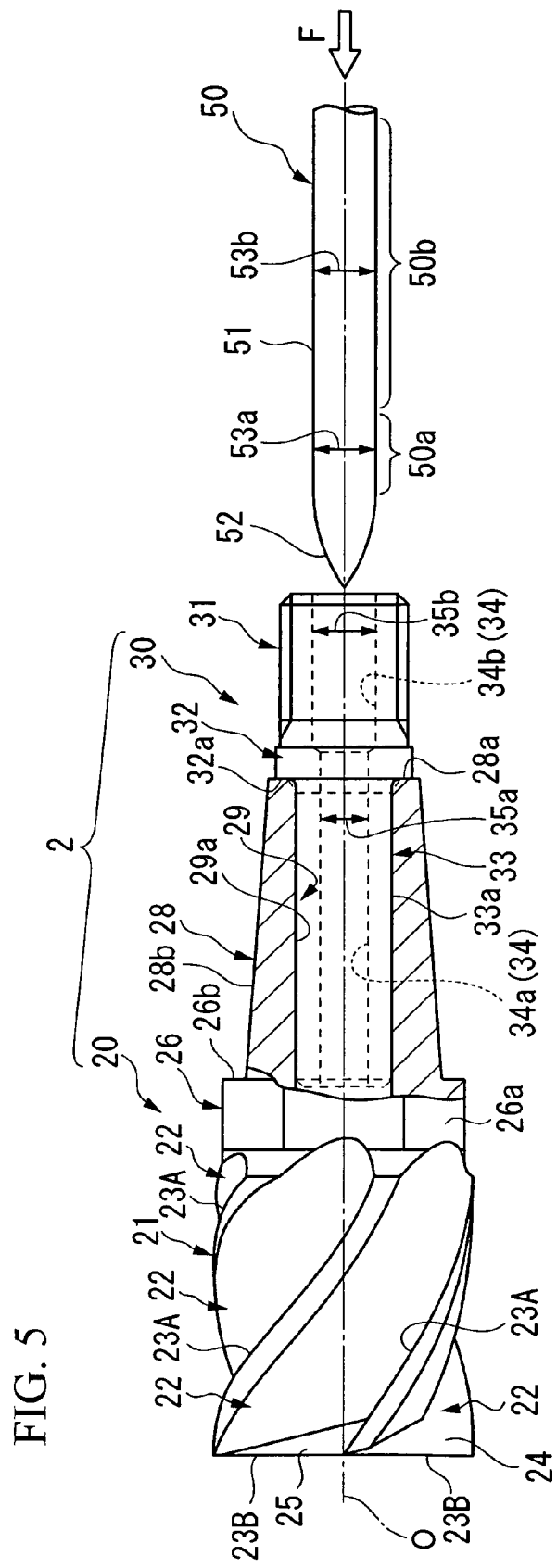
FIG. 5 is a side view showing the cutting head body related to the first embodiment, a cross-sectional view showing a portion of the cutting head body and showing a state where a press member (rod member) is pressed into a through hole of the connection member when the connection section of the connection member is inserted into the engaging hole of the cutting head body.

Firstly, as shown in FIG. 5, the shaft portion 33 of the connection member 30 is inserted into the engaging hole 29 of the cutting head body 20.

By means of this structure, the outer periphery 33*a* of the shaft portion 33 is opposed to the inner-peripheral face 29*a* of the engaging hole 29 with a slight clearance interposed therebetween.

In this case, since the external diameter 33*c* of the outer periphery 33*a* of the shaft portion 33 is less than the internal diameter 29*b* of the inner-peripheral face 29*a* of the engaging hole 29, the shaft portion 33 can be easily inserted into the engaging hole 29.

In a state where the shaft portion 33 is inserted into the engaging hole 29 in the above-described manner, the rear-end face 28*a* of the mounting portion 28 of the cutting head body 20 is in contact with the contact face 32*a* of the flange section 32.

Due to the contact, an inserted distance by which the shaft portion 33 of the connection member 30 is inserted into the engaging hole 29 of the cutting head body 20 is determined, and the shaft portion 33 is thereby prevented from being inserted into the engaging hole 29 while exceeding the inserted distance.

In addition, since the rear-end face 28*a* and the contact face 32*a* are flat faces orthogonal to the center line O, the center line O of the cutting head body 20 is parallel to the center line O of the connection member 30.

Subsequently, the press member 50 (rod member) is inserted into the through hole 34 from the rear-end of the connection member 30.

The press member 50 is made of a material harder than the connection member 30 and is formed in the shape of a rod.

The press member 50 includes a front-end 52, the above-described large-diameter portion 50*a*, and the above-described small-diameter portion 50*b*.

An external diameter 53*a* of the large-diameter portion 50*a* is greater than an external diameter 53*b* of the small-diameter portion 50*b*.

The difference between the external diameter 53*a* and the external diameter 53*b* is, for example, 20 μm to 200 μm. In addition, the external diameter of the press member 50 gradually decreases in a direction from the large-diameter portion 50*a* to the small-diameter portion 50*b* between the large-diameter portion 50*a* and the small-diameter portion 50*b*.

The external diameter 53*a* of the large-diameter portion 50*a* of the press member 50 is slightly greater than the internal diameter 35*a* of the small-diameter hole 34*a* formed inside of the shaft portion 33.

In addition, the front-end 52 of the press member 50 is tapered in which the diameter of the front-end 52 gradually decreases in a direction from a rear-end side of the large-diameter portion 50*a* toward the front-end 52.

By means of this structure, when the press member 50 is inserted into the through hole 34, it is possible to easily coincide a position of the press member 50 with a position of the through hole 34 (alignment).

When the press member 50 is inserted into the through hole 34, since the diameter of the press member 50 is greater than that of the small-diameter hole 34*a* of the through hole 34, it is necessary to apply a load F for the press member 50 toward the front-end side and press the press member 50 into the through hole 34.

The connection member 30 is made of stainless steel that is a plastically-deformable material. Therefore, when the press member 50 is pressed into the through hole 34 in the above-described manner, the connection member 30 is plastically-deformed such that the internal diameter of the through hole 34 (the internal diameter 35*a* of the small-diameter hole 34*a*) of the shaft portion 33 and the external diameter 33*c* of the outer periphery 33*a* increase.

For this reason, as shown in FIG. 3, a protuberance portion 33*b* is formed so as to protrude and enter into the toroidal groove 60 formed on the inner-peripheral face 29*a* of the engaging hole 29 at a portion of the outer periphery 33*a* of the shaft portion 33.

In addition, in the entire area between the inner-peripheral face 29*a* and the outer periphery 33*a*, the outer periphery 33*a* of the shaft portion 33 is in contact with the inner-peripheral face 29*a* of the engaging hole 29 and the outer periphery 33*a* thereby evenly and uniformly presses the inner-peripheral face 29*a*.

Therefore, the protuberance portion 33*b* of the outer periphery 33*a* of the shaft portion 33 is fitted into the toroidal groove 60.

In addition, the outer periphery 33*a* is attached firmly to the inner-peripheral face 29*a* of the engaging hole 29.

In this way, the outer periphery 33*a* of the shaft portion 33 is engaged with the inner-peripheral face 29*a* of the engaging hole 29 and the cutting head body 20 is connected with (coupled to) the connection member 30.

Specifically, the toroidal groove 60 has a wall section 60a facing the front-end side toward the center line O, and a wall section 60b facing the rear-end toward the center line O.

By means of this structure, as shown in FIG. 3, when the outer periphery 33a of the shaft portion 33 is fitted into the toroidal groove 60, the cutting head body 20 is prevented from being moved relative to the connection member 30 along the center line O.

That is, the moving the cutting head body 20 relative to the connection member 30 toward the center line O is prevented, and both thereof are in an integrated manner.

After the shaft portion 33 is attached firmly to the engaging hole 29 in the above-described manner, the press member 50 is removed from the through hole 34.

In addition, the shaft portion 33 is plastically-deformed while exceeding an elastic region, and a restorative force for returning to a former shape is not generated in the shaft portion 33. Therefore, even if the press member 50 is removed, a state where the shaft portion 33 is attached firmly to the engaging hole 29 is maintained.

In addition, when the press member 50 is pressed into the small-diameter hole 34a of the through hole 34, the internal diameter 35a of the small-diameter hole 34a increases depending on the external diameter 53a of the large-diameter portion 50a; however, there is a case where a restorative force is generated such that the internal diameter 35a of the small-diameter hole 34a is restored to an original internal diameter.

In this case, a part of the small-diameter hole 34a is attached firmly to only the large-diameter portion 50a, and a frictional force is generated at the position at which the small-diameter hole 34a is attached to the large-diameter portion 50a.

Specifically, as described above, the press member 50 is constituted of the large-diameter portion 50a and the small-diameter portion 50b. The small-diameter portion 50b has the external diameter 53b that is less than the diameter of the large-diameter portion 50a.

Thus, when the press member 50 is removed from the through hole 34, the small-diameter portion 50b is not in contact with the small-diameter hole 34a.

Consequently, a frictional force is not generated between the small-diameter hole 34a and the small-diameter portion 50b.

In addition, even if the small-diameter portion 50b is in contact with the small-diameter hole 34a and a frictional force is generated between the small-diameter hole 34a and the small-diameter portion 50b, the frictional force is much smaller than the frictional force generated between the small-diameter hole 34a and the large-diameter portion 50a.

Therefore, when the press member 50 is removed from the through hole 34, a large amount of force is not necessary. Practically, it is possible to remove the press member 50 from the through hole 34 by applying the force greater than the frictional force generated between the small-diameter hole 34a and the large-diameter portion 50a.

By removing the press member 50 from the through hole 34 in the above-described manner, the through hole 34 serves as a flow passage in which coolant flows, the coolant is used in a machining process.

The external diameter 53a of the large-diameter portion 50a in the press member 50 and the internal diameter 35a of the small-diameter hole 34a in the shaft portion 33 are adequately determined so that the shaft portion 33 is attached firmly to the engaging hole 29.

If, for example, the external diameter 53a of the large-diameter portion 50a exceeds a predetermined diameter, the external diameter 33c of the shaft portion 33 increases more than necessary, and there is a concern that the cutting head body 20 is cracked.

If, for example, the external diameter 53a of the large-diameter portion 50a is less than a predetermined diameter, it is not possible to adequately attach the inner-peripheral face 29a of the engaging hole 29 to the external diameter 33c of the shaft portion 33, and there is a concern that the connection member 30 is removed from the cutting head body 20.

For this reason, the external diameter 53a of the large-diameter portion 50a and the internal diameter 35a of the small-diameter hole 34a are determined so as to prevent the cutting head body 20 from being cracked and so that the outer periphery 33a of the shaft portion 33 can be adequately attached to the inner-peripheral face 29a of the engaging hole 29.

Furthermore, as described above, the internal diameter 29b of the inner-peripheral face 29a and the external diameter 33c of the outer periphery 33a are determined depending on an amount of torque that is applied to the exchangeable cutting head 2; however, it is necessary to attach the connection member 30 to the engaging hole 29 in order to sufficiently transmit a torque from the connection member 30 to the cutting head body 20.

Therefore, in terms of the torque, the external diameter 53a of the large-diameter portion 50a in the press member 50 and the internal diameter 35a of the small-diameter hole 34a in the shaft portion 33 are adequately determined so that the shaft portion 33 is attached to the engaging hole 29.

Subsequently, a method for attaching the exchangeable cutting head 2 in which the cutting head body 20 is connected with the connection member 30 in the above-described manner, to the tool body 10 will be described.

Firstly, the mounting portion 28 of the cutting head body 20 and the head screw section 31 of the connection member 30 are inserted into the mounting hole 12 of the tool body 10.

The head screw section 31 is screwed into the mounting screw section 14 formed in the mounting hole 12, and the cutting head body 20 is rotated around the center line O and screwed thereinto by use of a wrench that is engaged with the parallel faces 26a of the wrench engagement section 26 of the cutting head body 20.

In this way, substantially all of the taper surface 28b of the mounting portion 28 of the cutting head body 20 presses substantially all of the inner-peripheral face of the tapered hole 13 of the mounting hole 12, the center line O of the cutting head body 20 coincides with the center line O of the tool body 10, and a centering is thereby performed. Thus, the exchangeable cutting head 2 is removably attached to and fixed to the tool body 10.

In addition, the cutting head body 20 is further screwed into the mounting hole 12 in the above-described manner, high pressure is generated between the taper surface 28b and the tapered hole 13 caused by a wedge effect in that the taper surface 28b of the mounting portion 28 of the cutting head body 20 fitted onto the tapered hole 13 of the mounting hole 12 so as to form a tapered structure.

A high friction resistance is generated caused by the pressure, and it is thereby possible to tightly combine the cutting head body 20 with the tool body 10 in an integrated manner.

In addition, this structure avoids all of the tightening torque that is generated between the cutting head body 20 and the mounting portion 28 caused by the friction resistance to be applied to the head screw section 31 and the mounting screw section 14.

For this reason, an excessive axial tension is prevented from being generated between the head screw section 31 and the mounting screw section 14, it is possible to prevent the head screw section 31 and the mounting screw section 14 from being fractured, and prevent the connection member 30 from being removed from the cutting head body 20.

In addition, in a state where the exchangeable cutting head 2 is attached to the tool body 10, an axial tension applied to the head screw section 31 and the mounting screw section 14 is relieved.

Therefore, even in a case where the cutting head body 20 is not connected with the connection member 30 tighter than necessary, the connection member 30 is not removed from the cutting head body 20.

Thus, in a state where the exchangeable cutting head 2 is removed from the tool body 10, it is possible to easily separate the connection member 30 from the cutting head body 20.

Figure 6:
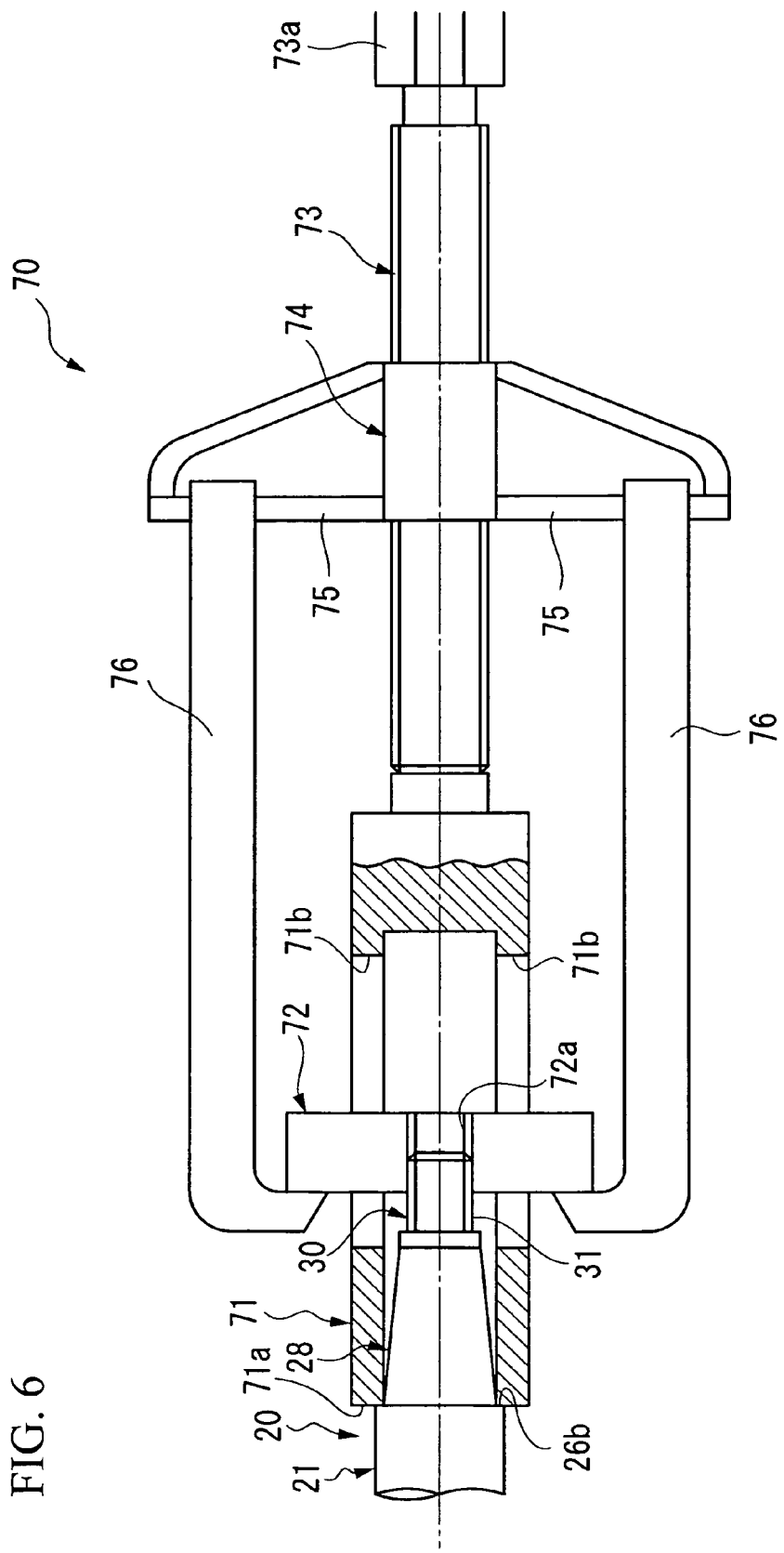
FIG. 6 is a side view showing a method for separating the connection member from the cutting head body related to the first embodiment by use of a jig.

Here, in the connection structure constituted of the above-described cutting head body 20 and connection member 30, it is possible to easily separate the connection member 30 from the cutting head body 20 by use of a connection release jig 70, for example, shown in FIG. 6.

The connection release jig 70 is provided with a jig body 71, a slide member 72, a bolt member 73, a screw-nut member 74, a pair of support sections 75 and 75, and a pair of arm sections 76 and 76.

The jig body 71 has a cylinder portion extending along the center line O and a bottom portion connected to the cylinder portion.

An opening portion is formed at a front-end face 71a of the cylinder portion.

A rear-end of the connection structure constituted of the cutting head body 20 and the connection member 30 is inserted into the opening portion.

When the cutting head body 20 and the connection member 30 are inserted into the opening portion, the front-end face 71a of the jig body 71 is in contact with the support face 26b of the wrench engagement section 26 (now shown in FIG. 6) of the cutting head body 20.

In this way, in a state where the mounting portion 28 and the head screw section 31 in the connection structure constituted of the cutting head body 20 and the connection member 30 is only inserted into the inside of the jig body 71, and the connection structure is supported by the jig body 71.

In addition, a pair of notched holes 71b is formed at the cylinder portion of the jig body 71 and is arranged so as to be opposed to each other with the center line O interposed therebetween.

The notched holes 71b are formed in parallel to the center line O so as to penetrate an outer-peripheral face of the cylinder portion.

The slide member 72 is a planer member inserted into the pair of the notched holes 71b of the above-described jig body 71 and can slide along the direction of the center line O relative to the jig body 71 in a region in which the above-described notched holes 71b are formed.

In addition, a female screw mounting hole 72a is formed at the center of the slide member 72 along the direction of the center line O.

In a state where the cutting head body 20 and the connection member 30 are supported by the jig body 71, the head screw section 31 of the connection member 30 is screwed into the female screw mounting hole 72a of the slide member 72.

Because of this, the slide member 72 is fixed to the connection member 30 toward the center line O in an integrated manner.

The bolt member 73 is formed as a rod shape and extends along the direction of the center line O.

A male screw is formed at an outer-peripheral face of the bolt member 73.

A front-end of the bolt member 73 is in contact with a rear-end of the above-described jig body 71.

In addition, the bolt member 73 can rotate relative to the jig body 71.

In addition, a bolt rotation section 73a is provided at a rear-end side of the bolt member 73. The bolt rotation section 73a is engaged with a wrench or the like.

The screw-nut member 74 is screwed with the above-described bolt member 73.

When the screw-nut member 74 rotates relative to the bolt member 73, the screw-nut member 74 moves relative to the bolt member 73 toward the center line O.

The pair of support sections 75 and 75 extending in a direction orthogonal to the center line O is provided at an outer-peripheral face of the screw-nut member 74.

The support sections 75 and 75 are symmetrically provided relative to the center line O.

Consequently, the arm sections 76 and 76 are provided at the support sections 75 and 75, respectively. The arm sections 76 and 76 extend in parallel to the center line O toward the front-end side.

A front-end of the arm sections 76 and 76 is curved in a radial-inner direction around the center line O, and is connected with the slide member 72 so as to be engaged with a face of the slide member 72 that faces toward the front-end side.

When removing the connection member 30 from the cutting head body 20 by use of the foregoing connection release jig 70, the bolt rotation section 73a is rotated around the center line O by use of a wrench or the like, and the screw-nut member 74 is moved relative to bolt member 73 in a direction toward the rear-end side.

In this way, the slide member 72 that is connected with the screw-nut member 74 with the support sections 75 and 75 and the arm sections 76 and 76 interposed therebetween is slid toward the rear-end side relative to the jig body 71.

The cutting head body 20 is supported by the jig body 71, and movement of the cutting head body 20 in the direction of the center line O is limited.

For this reason, the connection member 30 that is screwed with the slide member 72 is only pulled in the direction of the center line O toward the rear-end side.

That is, in a state where the cutting head body 20 is fixed, the connection member 30 is pulled away from the cutting head body 20.

Therefore, contrary to the structure in which the protuberance portion 33b is fitted into the toroidal groove 60 caused by plastic-deformation of the shaft portion 33, and contrary to the adhesive force by which the shaft portion 33 is attached firmly to the engaging hole 29, the connection member 30 is removed from the cutting head body 20. Thus, it is possible to easily separate the connection member 30 from the cutting head body 20.

The cutting tool 1 including the above-described structure rotates around the center line O in the tool rotation direction T in a state where the tool body 10 is attached to a machine tool.

Consequently, a work material is machined by the outer-peripheral cutting edge 23A and the cutting edge 23B of the cutting portion 21. A chip generated in the machining process is ejected by the flutes 22 from the tip to the rear-end side of the cutting portion 21.

In addition, the coolant is supplied to the coolant supply hole 16 of the tool body 10, and the coolant is ejected via the through hole 34 formed in the connection member 30 and the coolant hole (not shown) provided at the cutting head body 20 in the machining process.

In the cutting tool 1 of the embodiment, an individual cutting head body 20 and connection member 30 are employed, and a structure in which they are detachably connected with each other is adopted.

Therefore, it is possible for a material of the cutting head body 20 to be different from a material of the connection member 30.

That is, the cutting head body 20 having the cutting portion 21 used for machining a work material can be formed of a hard material such as cemented carbide, cermet, or ceramic, and the connection member 30 can be formed of a plastically-deformable material having a high degree of toughness such as stainless steel.

Therefore, it is possible to easily form the head screw section 31 by a machining process at a low cost while maintaining a high level of sharpness or durability in the cutting portion 21 of the cutting head body. Furthermore, it is possible to solve a problem in that a screw of the head screw section 31 is easily cracked. That is, an amount of abrasion in the cutting portion 21 is reduced, and it is possible to maintain a high level of sharpness or durability in the cutting portion 21.

In addition, the connection structure constituted of the cutting head body 20 and the connection member 30 is realized by pressing the press member 50 into the through hole 34 of the connection member 30 in a state where the shaft portion 33 of the connection member 30 is inserted into the engaging hole 29 of the cutting head body 20.

By means of this structure, it is possible to simply connect the connection member 30 with the cutting head body 20.

Furthermore, when the connection member 30 is connected with the cutting head body 20, the shaft portion 33 of the connection member 30 is plastically-deformed so that the diameter of the shaft portion 33 increases, and the protuberance portion 33b is formed on the inner-peripheral face 29a of the engaging hole 29 so as to protrude from the outer periphery 33a of the shaft portion 33 and to fit into the toroidal groove 60.

Therefore, it is possible to easily connect the connection member 30 with the cutting head body 20.

At this time, since the outer periphery 33a of the shaft portion 33 is attached firmly to the inner-peripheral face 29a of the engaging hole 29, it is possible to reliably connect the cutting head body 20 with the connection member 30 in an integrated manner.

Furthermore, it is possible to easily and reliably connect the cutting head body 20 with the connection member 30, by a simple structure in which the engaging hole 29 and the toroidal groove 60 are formed at the cutting head body 20 and in which the shaft portion 33 and the through hole 34 are formed at the connection member 30.

Consequently, when the cutting head body 20 and the connection member 30 are manufactured, it is not necessary to perform a complicated machining process, and it is possible to reduce the cost of manufacturing.

In addition, since the wall section 60a facing toward the front-end side in the direction of the center line O and the wall section 60b facing toward the rear-end in the direction of the center line O are formed on the toroidal groove 60 formed on the inner-peripheral face 29a of the engaging hole 29, it is possible to prevent the cutting head body 20 from being moved toward the center line O in relative to the connection member 30.

Therefore, it is possible to reliably connect the cutting head body 20 with the connection member 30.

Furthermore, when the head screw section 31 of the connection member 30 is screwed into the mounting screw section 14 of the mounting hole 12, the taper surface 28b of the mounting portion 28 of the cutting head body 20 is evenly and uniformly pressed onto the inner-peripheral face of the tapered hole 13 of the mounting hole 12, and they are thereby fitted onto each other so as to form a tapered structure.

Because of this, it is possible to further tightly attach the cutting head body 20 to the tool body 10, perfectly coincide the center line O of the cutting head body 20 with the center line O of the tool body 10, and perform a centering thereof.

In addition, a friction resistance is generated by a wedge effect in that the taper surface 28b of the mounting portion 28 of the cutting head body 20 is fitted onto the tapered hole 13 of the mounting hole 12 so as to form a tapered structure.

By the friction resistance, it is possible to tightly combine the cutting head body 20 with the tool body 10 in an integrated manner. Since the friction resistance is generated, all of the tightening torque generated between the cutting head body 20 and the mounting portion 28 is avoided from being applied to the head screw section 31 and the mounting screw section 14.

For this reason, it is possible to prevent the head screw section 31 and the mounting screw section 14 from being fractured, and prevent the connection member 30 from being removed from the cutting head body 20.

In addition, since a axial tension applied to the head screw section 31 and the mounting screw section 14 in the above-described manner is relieved, it is not necessary to connect the cutting head body 20 with the connection member 30 tighter than necessary.

Because of this, it is possible to easily separate the cutting head body 20 from the connection member 30.

In addition, the through hole 34 is formed at the connection member 30, and the coolant hole (not shown) is formed at he cutting head body 20. The coolant hole is communicated with the through hole 34 and the flutes 22.

Consequently, it is possible to eject the coolant that is supplied to the cutting portion 21 via the coolant supply hole 16 of the tool body 10 from the cutting portion 21, lubricity is improved in a machining process, heat caused by a machining process is removed, and it is thereby possible to improve a precision in a machining process. In addition, when the cutting head body 20 and the connection member 30 are attached to the tool body 10, it is possible to easily and tightly attach the exchangeable cutting head 2 to the tool body 10 by screwing and rotating a wrench around the center line O in a state where the wrench is engaged with the parallel faces 26a of the wrench engagement section 26 formed at the cutting head body 20.

In addition, it is possible to easily separate the cutting head body 20 from the connection member 30 via the above-described connection release jig 70.

Therefore, even if, for example, the cutting portion 21 of the cutting head body 20 cannot be used due to abrasion, it is possible to retrieve only the cutting head body 20 made of cemented carbide, cermet, ceramic or the like as a resource in which impurities are not mixed, separately from the other material. Therefore, it is possible to realize recycling such that parts are re-formed.

In addition, in a state where the connection structure constituted of the cutting head body 20 and the connection member 30 are attached to the tool body 10, the through hole 34 of the connection member is positioned at the inside of the mounting portion 28 of the cutting head body 20. Therefore, a hollow portion is formed inside of the mounting portion 28.

Therefore, when the taper surface 28*b* of the mounting portion 28 presses onto the tapered hole 13 of the mounting hole 12, since the taper surface 28*b* is attached firmly to the tapered hole 13 in a state where the diameter of the mounting portion 28 slightly decreases, it is possible to comfortably and reliably fit the tapered hole 13 onto the mounting portion 28 so as to form a tapered structure.

As a result, it is possible to reliably attach the cutting head body 20 to the tool body 10.

Furthermore, for example, even if the support face 26*b* of the wrench engagement section 26 is in contact with the front-end face 11 of the tool body 10 in addition to the structure in which the tapered hole 13 is in contact with the taper surface 28*b*, that is, even if the cutting head body 20 is restrained by the two faces, since the taper surface 28*b* is attached firmly to the tapered hole 13 while the diameter of the mounting portion 28 slightly decreases in the above-described manner, an adhesion between the taper surface 28*b* and the tapered hole 13 is ensured, and it is possible to improve the attachment strength.

In this case, a frictional force is generated in a first structure in which the taper surface 28*b* is in contact with the tapered hole 13, and a frictional force is generated in a second structure in which the support face 26*b* is in contact with the front-end face 11. Therefore, it is possible to improve the attachment strength.

Moreover, during a machining process by use of the cutting tool 1, even if the diameter of the tapered hole 13 increases because of a centrifugal force caused by a high speed rotation, the diameter of the taper surface 28*b* of the mounting portion 28 of the cutting head body 20 at the same time. Therefore, the strength of the attachment between the mounting portion 28 and the tapered hole 13 is not reduced, and it is possible to reliably fit the two taper surfaces together.

Thus, it is possible to perform a machining process in a state where the cutting head body 20 is reliably attached to the tool body 10.

Second Embodiment

Next, a cutting tool 80 having an exchangeable cutting head of a second embodiment of the present invention will be described with reference to FIGS. 7 and 8.

Figure 7:
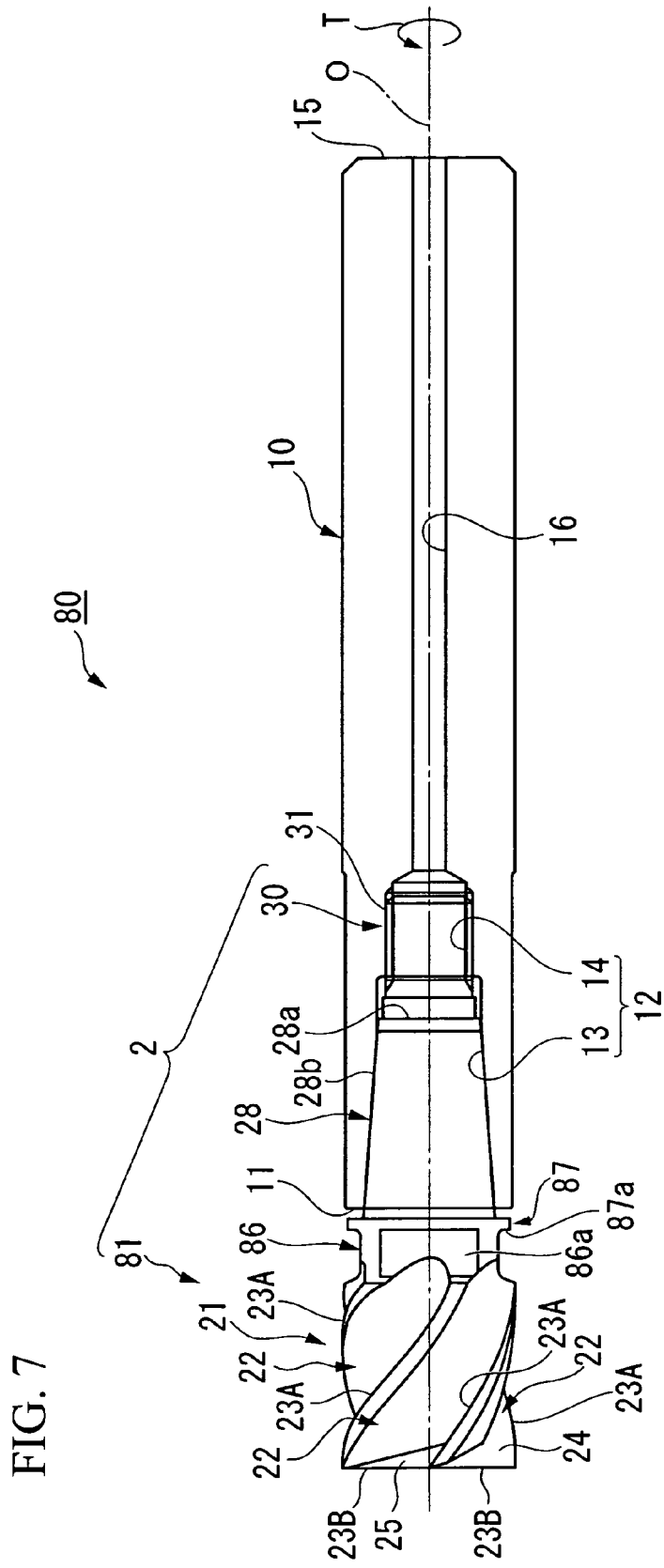
FIG. 7 is a side view showing a cutting tool having an exchangeable cutting head related to a second embodiment, and a cross-sectional view showing a portion of the cutting tool.
Figure 8:
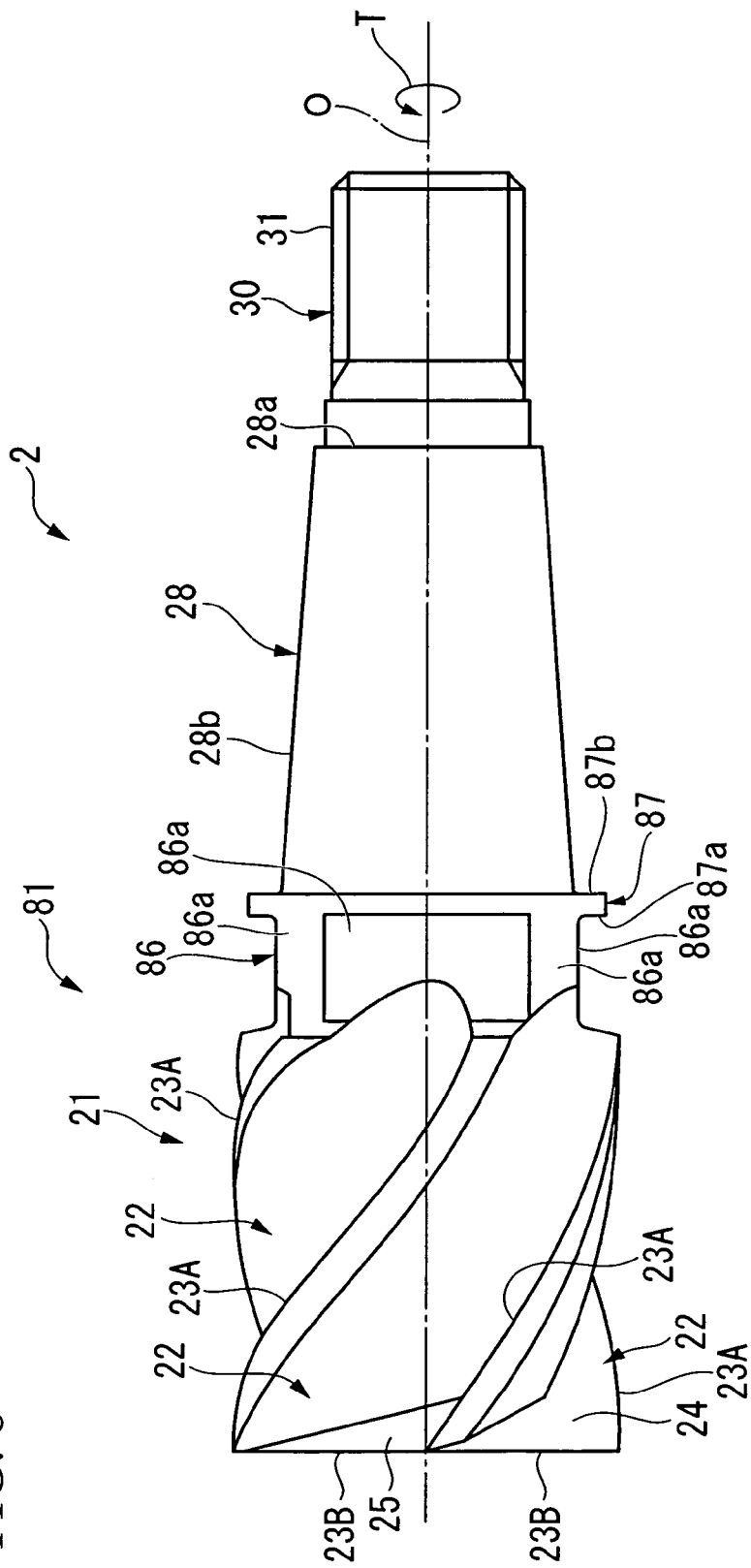
FIG. 8 is a side view showing a exchangeable cutting head related to the second embodiment.

In FIGS. 7 and 8, identical symbols are used for the elements which are identical to those of the cutting tool 1 of the first embodiment, and the explanations thereof are omitted or simplified.

In the cutting tool 80 of the second embodiment, a cutting head body 81 has a wrench engagement section 86 (rotation section).

A wrench engagement section 86 has an outer-peripheral face formed as a center circular cylinder around the center line O.

A portion of the outer-peripheral face is machined in a direction parallel to the center line O and in a direction from the outer-peripheral face to the center line O by a predetermined depth.

Consequently, the outer-peripheral face of the wrench engagement section 86 has two pairs of parallel faces 86*a* (notched face).

In the circumferential direction, a curved surface that is a part of the outer-peripheral face remains between the parallel faces 86*a* adjacent to each other.

Consequently, the wrench engagement section 86 is formed as a chamfered regular tetragon. Specifically, in the chamfered regular tetragon, each of angle portions of the regular tetragon in a cross section orthogonal to the center line O is chamfered by a circular arc. The center of the circular arc is the center line O.

In addition, at the rear-end side of the wrench engagement section 86, that is, at the rear-end side of the parallel faces 86*a*, an outer-peripheral face formed as a circular cylinder remains so as to be aligned with the wrench engagement section 86. Therefore, a flange 87 is formed so as to protrude in a radial-outer direction from the center line O.

In FIGS. 7 and 8, a configuration of the flange 87 viewed from a cross-sectional face orthogonal to the center line O is substantially a circular form. The present invention is not limited to being circular. The flange 87 may be, for example, a polygon or an ellipse.

In addition, as a configuration of the flange 87, not only a configuration in which the flange 87 protrudes in a circumferential direction of the entire area from the center axis O, but also a configuration in which the flange 87 protrudes from one of a plurality of parallel faces 86*a* may be formed.

Furthermore, in the flange 87, a face facing the front-end side in the direction of the center line O is a flat flange face 87*a* (first flange face) that is substantially orthogonal to an axis line O. In addition, a face facing the rear-end side in the direction of the center line O is a flat flange face 87*b* (second flange face) that is substantially orthogonal to an axis line O.

The flange faces 87*a* and 87*b* are perpendicularly intersected with each parallel face 86*a* of the wrench engagement section 86.

In the foregoing cutting tool 80 of the second embodiment, for example, by disposing the flange faces 87*a* and 87*b* of the flange 87 so as to be in contact with a jig or the like, it is thereby possible to tightly fix the cutting head body 81 in the direction of the center line O.

In addition, it is possible to further tightly and stably fix the cutting head body 81 to the head fixing jig 90 by employing a structure in which the above-described jig is in contact with the flange faces 87*a* and 87*b* and the parallel faces 86*a* of the wrench engagement section 86 is in contact with the above-described jig.

Therefore, it is possible to easily connect the cutting head body 81 with the connection member 30 and easily separate the connection member 30 from the cutting head body 81.

In addition, when the cutting portion is re-polished or coated by use of a PVD method, it is possible to reliably support the cutting head body 81.

Figure 9:
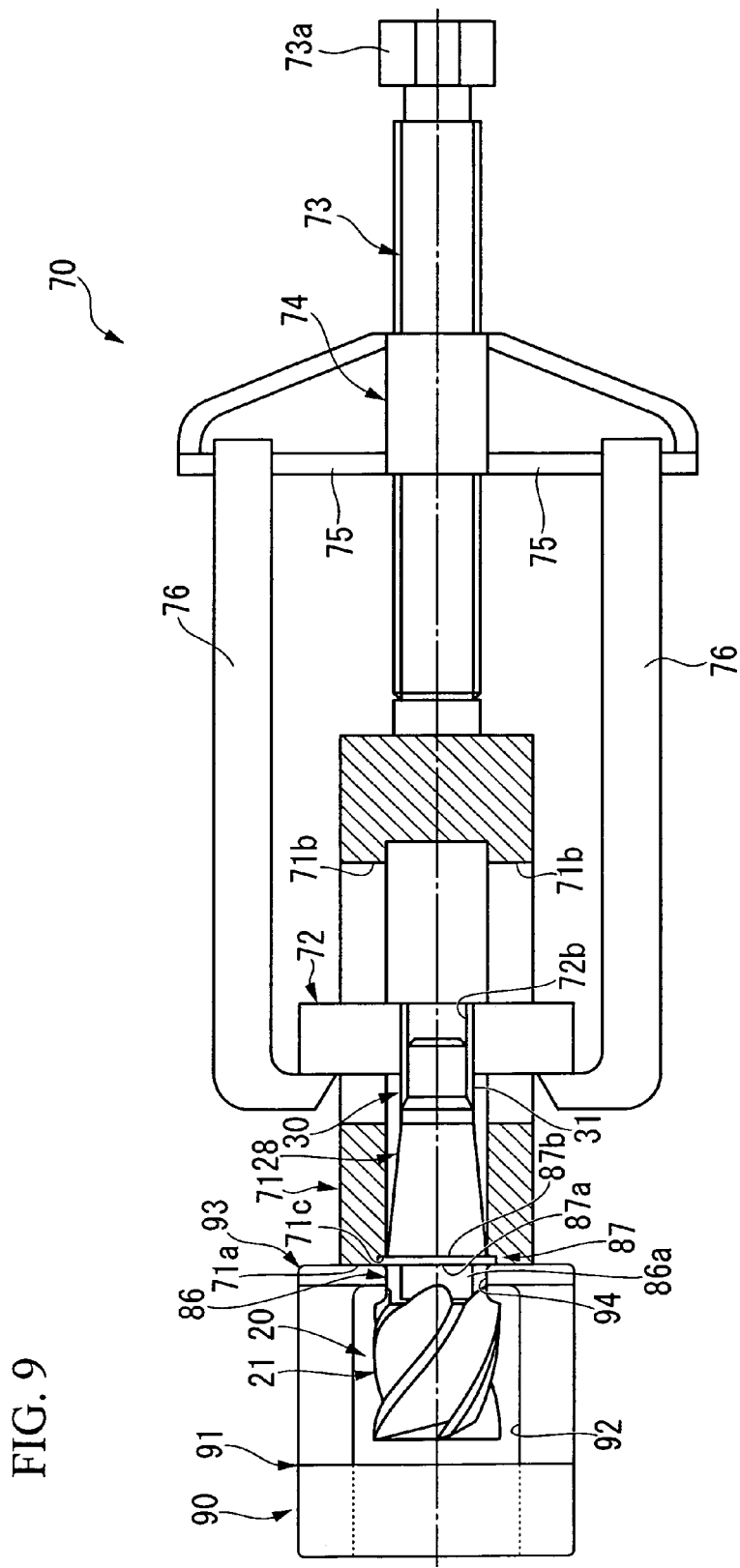
FIG. 9 is a side view showing a method for separating the connection member from the cutting head body related to the second embodiment by use of a jig.

In addition, in the cutting tool 80 of the second embodiment, by employing the above-described connection release jig 70 and a head fixing jig 90 shown in FIG. 9, it is possible to easily separate a connection structure constituted of the cutting head body 81 and the connection member 30 into two components.

Figure 10A:
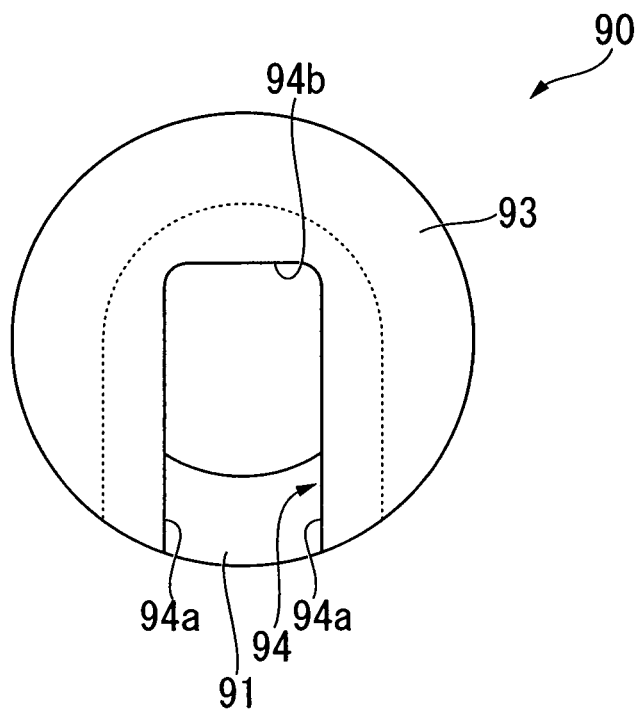
FIG. 10A is a plan view showing a head fixing jig.
Figure 10B:
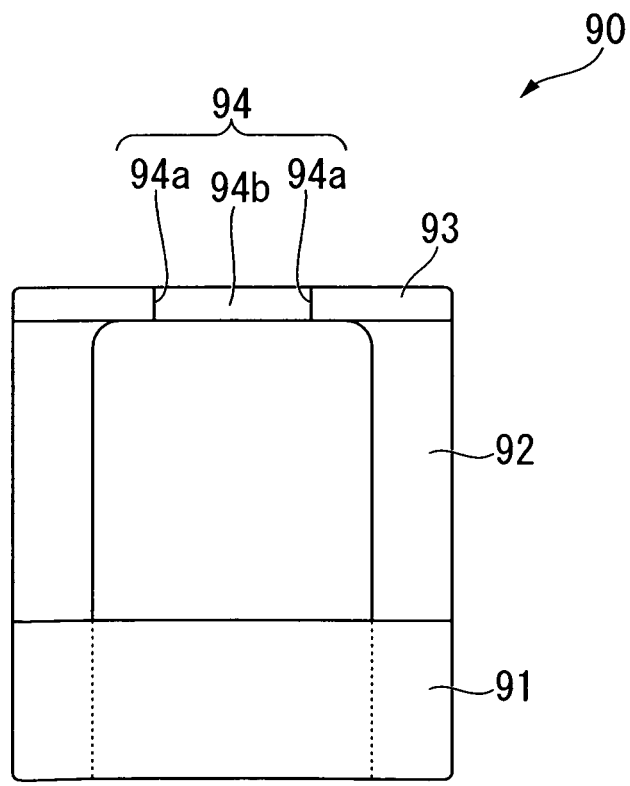
FIG. 10B is a plan view showing a head fixing jig.

As specifically shown in FIGS. 10A and 10B, the head fixing jig 90 includes a circular cylinder portion 91 and a cap section 93 that is provided at one end of the circular cylinder portion 91 and is connected with the circular cylinder portion 91 in an integrated manner.

An external form of the circular cylinder portion 91 is substantially a circular cylinder whose center is an axis line L.

A cutting portion insert portion 92 that is formed as a U-shape a is formed at a part of circular cylinder portion 91 in a circumferential direction.

The cutting portion insert portion 92 has a predetermined width in the circumferential direction.

The cutting portion insert portion 92 is formed by machining from one end of the circular cylinder portion 91 toward the other end thereof.

The size of the cutting portion insert portion 92 is determined such that the cutting portion 21 of the cutting head body 81 can be inserted into the circular cylinder portion 91 from the outside toward the inside in a radial direction of the circular cylinder portion 91 through the cutting portion insert portion 92.

A configuration of the cap section 93 is substantially a circular disk having the same external diameter as that of the circular cylinder portion 91.

An insert slit 94 that is U-shaped from an outer-peripheral side toward the inside thereof in a radial direction is provided at the cap section 93.

The insert slit 94 includes slit side edges 94a facing each other in parallel.

The width of the insert slit 94, that is, a distance between the slit side edges 94a is substantially the same distance between the pair of the parallel faces 86a of the wrench engagement section 86 in the cutting head body 81.

In addition, a slit rear-end 94b that is positioned at a rear-end of the insert slit 94 is orthogonal to each slit side edge 94a.

The cap section 93 is provided at one end of the circular cylinder portion 91 and formed so as to be integrated with the circular cylinder portion 91 in one body in a state where a position of the insert slit 94 in a circumferential direction thereof is coincided with a position of the cutting portion insert portion 92 of the circular cylinder portion 91.

The foregoing head fixing jig 90 supports the cutting head body 81 of the exchangeable cutting head 2 which is attached to the connection release jig 70 in a manner similar to the first embodiment. In the connection release jig 70 of the second embodiment shown in FIG. 9, a flange support section 71c is provided at the front-end face 71a of the jig body 71.

That is, the cutting portion 21 of the cutting head body 81 is inserted into the inside of the circular cylinder portion 91 through the cutting portion insert portion 92 from the radial-outer direction with respect to the head fixing jig 90.

In addition, the wrench engagement section 86 of the cutting head body 81 is inserted into the insert slit 94 of the cap section 93.

At this time, the center line O of the exchangeable cutting head 2 is coincided with the axis line L of the head fixing jig 90, and the flange face 87a of the flange 87 is in contact with one end of the cap section 93. The flange face 87b is in contact with the flange support section 71c.

Furthermore, each of three parallel faces 86a of the wrench engagement section 86 of the cutting head body 81 is in contact with the pair of the slit side edge 94a and the slit rear-end 94b.

In this way, a position of the cutting head body 81 can be coincided with the direction of the center axis O (alignment), and the cutting head body 81 can be stably and tightly fixed.

Consequently, in the state described above, when the bolt rotation section 73a is rotated around the center line O by use of a tool such as a wrench, the flange face 87b is attached firmly to the flange support section 71c, a pressure is applied to the flange support section 71c, and the connection member 30 is pulled away from the cutting head body 81. Therefore, it is possible to pull the connection member 30 away from the cutting head body 81 in the center line O in a state where the cutting head body 81 is stably fixed.

As a result, it is possible to remove the connection member 30 from the cutting head body 81 and easily separate the connection member 30 from the cutting head body 81.

In the above-described manner in the second embodiment, the flange face 87a of the flange 87 of the cutting head body 81 is in contact with the cap section 93 of the head fixing jig 90, the flange face 87b is attached firmly to the flange support section 71c; furthermore, the wrench engagement section 86 is locked inside of the insert slit 94 of the cap section 93.

For this reason, it is possible to stably and easily separate the connection member 30 from the cutting head body 81 by use of the connection release jig 70.

In addition, since the cutting head body 81 from which the connection member 30 has been separated is stabilized to the head fixing jig 90, the cutting head body 81 is prevented from dropping off or the like, and it is thereby possible to safely perform a separation operation.

Next, a method for connecting the connection member 30 with the cutting head body 81 by use of the above-described connection release jig 70, head fixing jig 90, and press member 50 will be described with reference FIG. 11.

Figure 11:
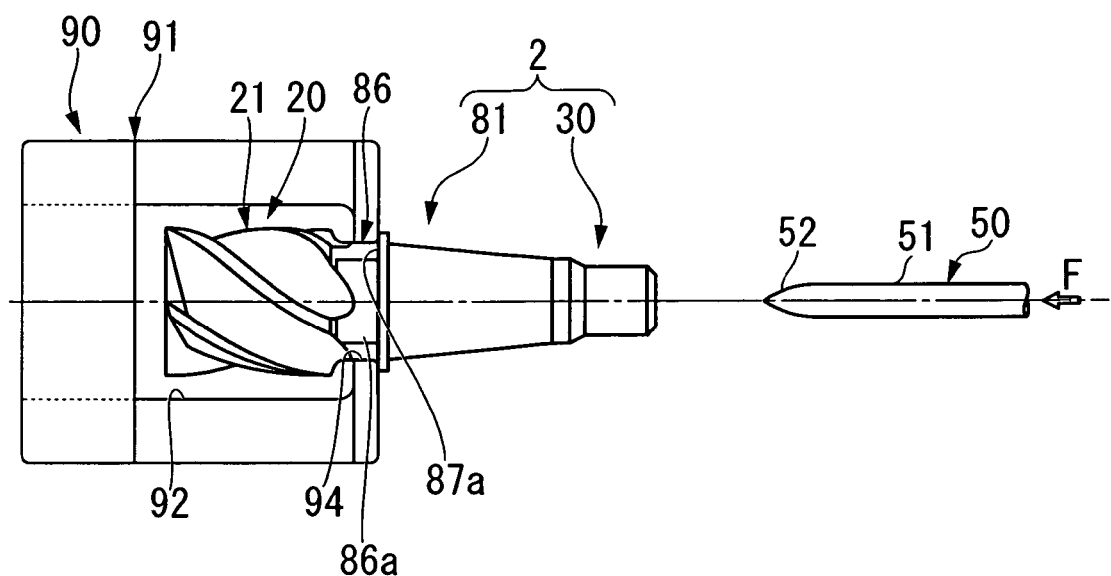
FIG. 11 is a side view showing a method for connecting the connection member with the cutting head body related to the second embodiment by use of a jig, and showing a state where a press member (rod member) is pressed into a through hole of the connection member.

Firstly, as shown in FIG. 11, the cutting head body 81 fixed to the above-described head fixing jig 90. A structure in which the cutting head body 81 is fixed to the head fixing jig 90 is the same structure as shown in FIG. 9.

In FIG. 11, the center line O of the cutting head body 81 coincides with the axis line L of the head fixing jig 90, and the flange face 87a of the flange 87 is in contact with one end of the cap section 93.

Next, as shown in FIG. 11, the connection member 30 is inserted into the cutting head body 81. Specifically, as shown in FIG. 5, the shaft portion 33 of the connection member 30 is inserted into the engaging hole 29 of the cutting head body 81.

Next, the press member 50 is inserted into the through hole 34 from the rear-end of the connection member 30, the press member 50 is pressed into the small-diameter hole 34a, and the internal diameter 35a of the small-diameter hole 34a thereby increases. At this time, the center line O of the exchangeable cutting head 2 is coincided with the axis line L of the head fixing jig 90, and the flange face 87a of the flange 87 is in contact with one end of the cap section 93.

Furthermore, a pressure is applied to one end of the cap section 93 while inserting the press member 50, and the connection member 30 is pressed into the cutting head body 81.

Consequently, it is possible to press the connection member 30 into the cutting head body 81 in a state where the cutting head body 81 is stably fixed to the head fixing jig 90.

As described above, the flange 87 is in contact with the head fixing jig 90 by use of the head fixing jig 90, and it is possible to fix the cutting head body 81 to the head fixing jig 90.

For this reason, even if the cutting portion 21 (cutting edge) including the outer-peripheral cutting edge 23A and the cutting edge 23B has been formed on the cutting head body 81, it is possible to connect the connection member 30 with the cutting head body 81 without damaging the cutting portion 21.

In addition, since the flange 87 is supported by the head fixing jig 90, the cutting head body 81 is prevented from dropping off, and it is possible to separate the connection member 30 from the cutting head body 81.

Generically, an operation of connecting the connection member with the cutting head body is performed before forming the cutting edge.

That is, in a state where the connection member is connected with the cutting head body, the cutting edge is formed by use of a high temperature process including a coating process.

In this case, the connection structure constituted of the cutting head body and the connection member is subjected to a high temperature atmosphere, the connection member is deformed along with temperature change, and there is a concern that a degree of precision of the head screw section is degraded.

In contrast, in this embodiment, the cutting portion 21 (cutting edge) including the outer-peripheral cutting edge 23A and the cutting edge 23B is preliminarily formed on the cutting head body 81; thereafter, the cutting head body 81 is fixed to the head fixing jig 90, the cutting head body 81 is connected with the connection member 30. In this case, the connection structure constituted of the cutting head body 81 and the connection member 30 is not subjected to a high temperature atmosphere such as a coating process.

That is, it is possible to ensure the degree of precision in the head screw section without deformation of the connection member.

Third Embodiment

Next, a cutting tool 100 having an exchangeable cutting head of a third embodiment of the present invention will be described with reference to FIGS. 12 and 13.

Figure 12:
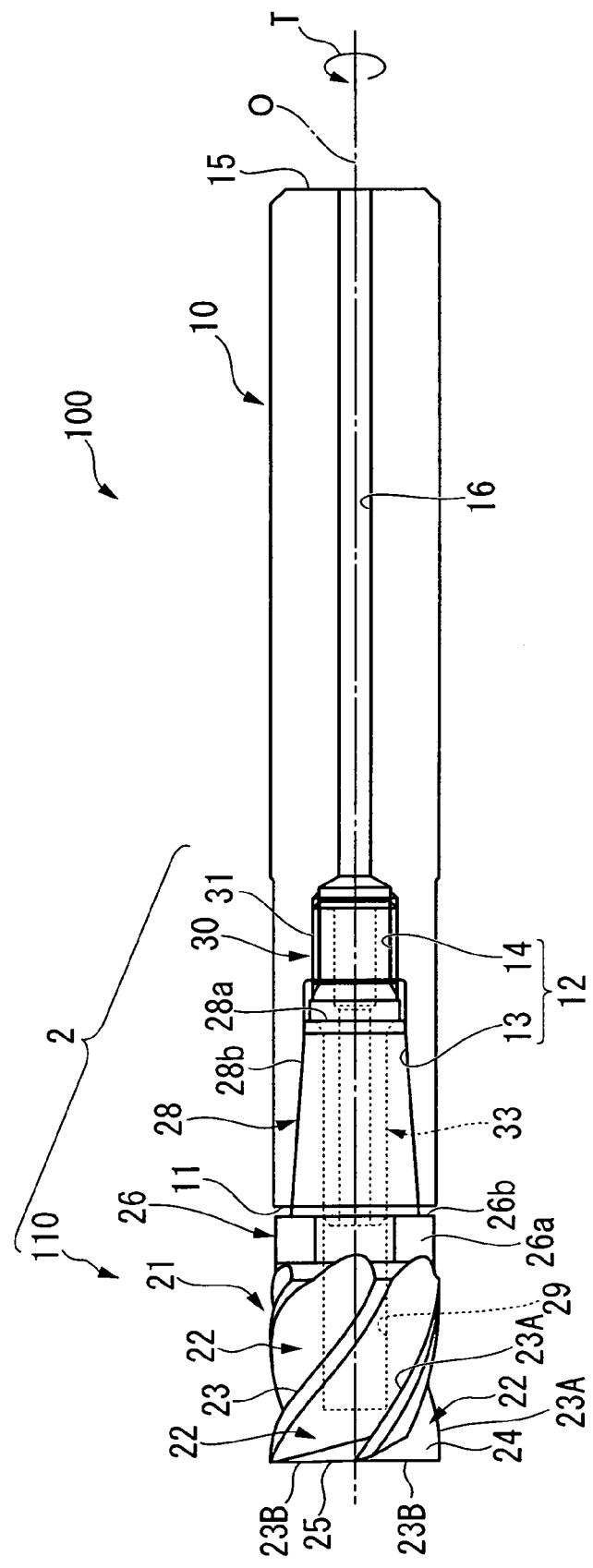
FIG. 12 is a side view showing a cutting tool having an exchangeable cutting head related to a third embodiment, and a cross-sectional view showing a portion of the cutting tool.
Figure 13:
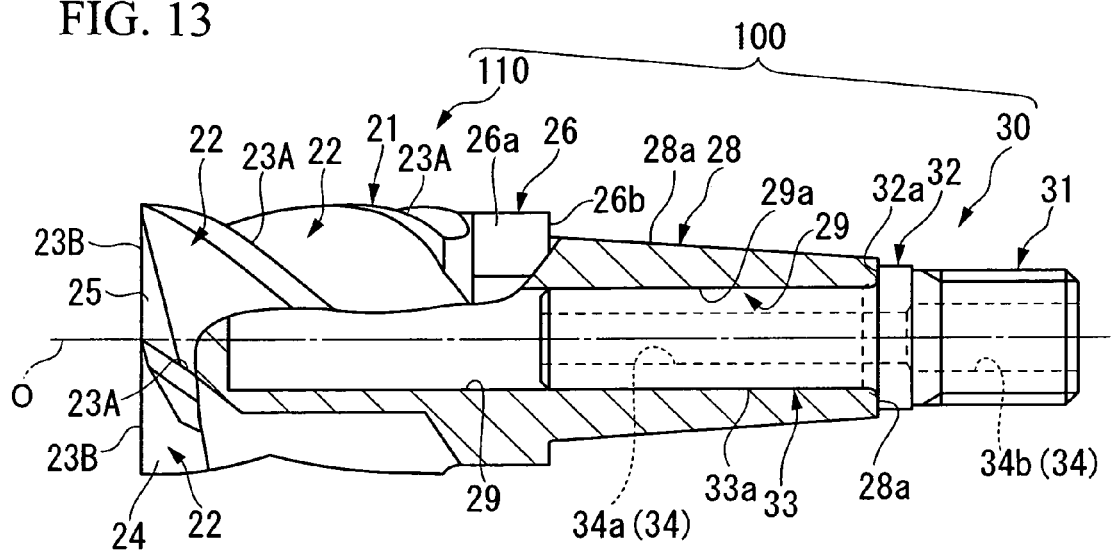
FIG. 13 is a side view showing an exchangeable cutting head related to the third embodiment, and a cross-sectional view showing a portion of exchangeable cutting head.

In FIGS. 12 and 13, identical symbols are used for the elements which are identical to those of the cutting tool 1 of the first embodiment, and the explanations thereof are omitted or simplified.

In the cutting tool 100 of the third embodiment, the engaging hole 29 that opens at the rear-end face 28a of the mounting portion 28 of the cutting head body 110 is not only formed at the inside of the mounting portion 28 but also formed so as to further extend toward the front-end side and reach the inside of the cutting portion 21.

As a result, since the weight of the cutting head body 110 can be reduced, vibration is prevented from being generated at the cutting portion 21 during a machining process, and it is thereby possible to perform a machining process with a high level of precision.

As described above, the cutting tool 1, 80, and 100 of the embodiment of the present invention are described in detail. The technical scope of the present invention is not limited to the above embodiments, but various modifications may be made without departing from the scope of the present invention.

In the first embodiment, the structure including the toroidal groove 60 having the wall section 60a facing the front-end side toward the center line O and the wall section 60b facing the rear-end toward the center line O is described; however, at least the wall section 60a facing the front-end side toward the center line O may be simply formed.

By means of this structure, in a case in which the protuberance portion 33b is formed at the connection member 30 in a state where the cutting head body 20 is coupled to the connection member 30, movement of the cutting head body 20 in relative to the connection member 30 so as to be away from each other in the direction of the center line O is prevented.

In the direction (direction of the center line O) in which the connection member 30 is inserted into the cutting head body 20, since the rear-end face 28a of the mounting portion 28 of the cutting head body 20 is in contact with the contact face 32a of the flange section 32 of the connection member 30, the inserted distance by which the connection member 30 is inserted into the cutting head body 20 is determined.

Because of this, even if the wall section 60b facing the rear-end toward the center line O is not formed, a problem does not occur.

In addition, a linear groove extending along the direction of the center line O may be formed at the inner-peripheral face 29a instead of the foregoing toroidal groove 60.

In this case, the linear groove has a wall section facing in a circumferential direction around the center line O.

By means of this structure, when a protuberance portion 33b that is fitted into the linear groove is formed at the connection member 30 in a state where the cutting head body 20 is coupled to the connection member 30, it is possible to reliably prevent the cutting head body 20 from being rotated around the center line O relative to the connection member 30.

In addition, both of the foregoing linear groove and the above-described toroidal groove 60 may be formed. In addition, the foregoing toroidal groove 60 or the linear groove may be formed at a plurality of portions.

Furthermore, a groove formed as a spiral (helix) may be formed around an axis line O. In addition, at least two spiral grooves (helix groove) may be formed around an axis line O. In this case, twist directions of the two grooves toward the axis line O are opposite to each other.

In addition, a recessed portion formed at the inner-peripheral face 29a is not limited to grooves, and a structure in which a plurality of recessed portions is formed as dots may be employed.

As long as a structure in which the inner-peripheral face 29a of the cutting head body 20 is engaged with the shaft portion 33 of the connection member 30, the present invention is not limited to the above-described structure, and a recessed portion having the other configuration may be formed at the inner-peripheral face 29a.

In addition, in the above-described embodiments, a structure in which the recessed portion is formed at the inner-peripheral face 29a of the cutting head body 20 is described; however a protuberance portion may be provided at the shaft portion 33 of the connection member 30, and the shaft portion 33 may be fixed to the inner-peripheral face 29a.

However, in this case, the shaft portion 33 is made of stainless steel that is a plastically-deformable material, and the cutting head body 20 is made of a hard material harder than stainless steel. Therefore, when the press member 50 is pressed into the through hole 34 in the above-described manner, the protuberance portion provided at the shaft portion 33 is compressed and plastically-deformed, and the inner-peripheral face 29a of the cutting head body 20 is thereby in contact with the shaft portion 33 of the connection member 30.

In the case in which the protuberance portion is provided at the shaft portion 33 in the above-described manner, there is a concern that a contact area between the inner-peripheral face 29a and the shaft portion 33 can not sufficiently-obtained.

In addition, a recessed portion may be provided at the shaft portion 33 of the connection member 30, and the shaft portion 33 may be locked to the inner-peripheral face 29a.

However, in this case, since the inner-peripheral face 29a is not engaged with the recessed portion of the shaft portion 33, there is a concern that the connection member 30 is easily removed from the cutting head body 20.

Therefore, as a structure in which the connection member 30 is reliably fixed to the cutting head body 20, the structure in which the recessed portion is formed at the inner-peripheral face 29a of the cutting head body 20 as described above is preferably employed.

In addition, in the above-described embodiments, in the entire area between the inner-peripheral face 29a and the outer periphery 33a, the structure in which the outer periphery 33a of the shaft portion 33 is in contact with the inner-peripheral face 29a of the engaging hole 29 is described; however, a structure in which the outer periphery 33a is in contact with the inner-peripheral face 29a in a part of a region between the inner-peripheral face 29a and the outer periphery 33a may be employed.

That is, because of the above-described plastic-deformation in the inside of the engaging hole 29, a structure including a region in which the diameter of a outer periphery 33a is large and a non-plastically-deformed region may be employed.

In this case, an area in which the outer periphery 33a is in contact with inner-peripheral face 29a is set so as to sufficiently-obtain a connection strength in the connection structure constituted of the cutting head body 20 and the connection member 30.

In the structure, when the connection member 30 is separated from the cutting head body as shown in FIG. 6 or FIG. 9, it is possible to relatively reduce a force for removing the connection member 30 from the cutting head body, and easily perform a separation step.

In addition, as a position at which the recessed portion is formed, recessed portions may be formed in the inside of the engaging hole 29 by a constant distance, recessed portion may be partially formed inside of the engaging hole 29.

The recessed portion (toroidal groove 60) may be formed, for example, at a region indicated by reference numeral 85 in FIG. 2, that is, at a position adjacent to an opening portion of the engaging hole 29 (position close to the rear-end face 28a).

In this case, it is preferable that the press member 50 be inserted into the through hole 34 so as to cause the a region indicated by reference numeral 95 in FIG. 4, namely, positions adjacent to the flange section 32 to be plastically-deformed.

In this case, it is not necessary to insert the press member 50 into the inside of the through hole 34 so that the press member 50 is positioned at the entire area of the through hole 34.

A depth at which the press member 50 is inserted into the through hole 34 is determined so as to correspond to a position at which the recessed portion is formed.

In this manner, the outer periphery 33a is intensively plastically-deformed at a region 85 of the engaging hole 29 on which the recessed portion is formed, the protuberance portion 33b is formed, and it is thereby possible to tightly engage the cutting head body with the connection member 30.

That is, since the outer periphery 33a is partially plastically-deformed in the vicinity of an inlet port of the engaging hole 29 in a state where the outer periphery 33a is not plastically-deformed in the entire area between the inner-peripheral face 29a and the outer periphery 33a, a connection strength can be sufficiently obtained.

In addition, since the outer periphery 33a is not plastically-deformed in the entire between the inner-peripheral face 29a and the outer periphery 33a, it is possible to relatively reduce a force for removing the connection member 30 from the cutting head body when the connection member 30 is separated from the cutting head body. As a result, it is possible to easily perform a separation step.

In addition, a recessed portion that is provided with at least one of the wall section facing the front-end side toward the center line O and the wall section facing toward the circumferential direction around the center line O may be formed at the inner-peripheral face 29a of the engaging hole 29 in addition to the above-described toroidal groove 60 or the linear groove.

Also, in the foregoing structure, part of the outer periphery 33a of the shaft portion 33 of the connection member 30 protrudes toward the recessed portion and is fitted into the recessed portion. It is possible to prevent the connection member 30 from being separated from the cutting head body 20 toward the center line O and from being moved relative to the cutting head body 20. In addition, it is possible to prevent the connection member 30 from being rotated relative to the cutting head body 20 around the center line O.

In addition, instead of the above-described toroidal groove 60, an uneven face (recessed portion) in which the surface roughness in maximum height Rz of the uneven face is 5 μm to 200 μm may be formed on the inner-peripheral face 29a of the engaging hole 29.

A steps for manufacturing the cutting head body 20 includes molding a molding process and a sinter bonding process.

The molding process includes a first step (first molding step) in which a fine powder material is solidified and the cutting head structure is obtained, a step for machining the cutting head structure, and a second step (second molding step) in which a face having a desired surface roughness is formed on the cutting head structure.

A condition of the uneven face is adjusted by controlling a forming condition in the second step. When the uneven face is formed in the above-described manner, the above-described toroidal groove 60, the linear groove, or the recessed portion may be formed on the inner-peripheral face 29a of the engaging hole 29. In addition, it is not necessary for the above-described grooves or the recessed portion to be formed on the inner-peripheral face 29a.

In the case where the uneven face is formed at the inner-peripheral face 29a of the engaging hole 29 in the above-described manner, when the press member 50 is pressed into the through hole 34 of the connection member 30 in a state where the shaft portion 33 of the connection member 30 is inserted into the engaging hole 29 of the cutting head body 20, the outer periphery 33a of the shaft portion 33 of the connection member 30 is plastically-deformed along the uneven face of the above-described the inner-peripheral face 29a of the engaging hole 29.

In this way, a frictional force generates between the inner-peripheral face 29a of the engaging hole 29 and the outer periphery 33a of the shaft portion 33, and the cutting head body 20 is easily and reliably connected with the connection member 30.

In addition, a cobalt-rich region is formed on a surface of the inner-peripheral face 29a. In the cobalt-rich region, cobalt that is one of constituent materials of the cutting head body 20 with large amount is included. The cobalt-rich region is appeared on a surface of the inner-peripheral face 29a by heating the cutting head structure in the above-described sinter bonding process. The above-described cobalt-rich region may be a thin film having cobalt as main component and a thickness of 0.5 μm to 5 μm.

In addition, it is possible to easily control a value of the surface roughness in maximum height Rz of the inner-peripheral face 29a of the engaging hole 29 by omitting a polishing treatment after the cutting head body 20 is molded.

Next, a method for adjusting the maximum height of roughness profile Rz of the inner-peripheral face 29a will be specifically described.

Firstly, a cutting head structure is formed in the first molding step.

Subsequently, the inner-peripheral face 29a is machined in the second molding step in order to obtain a predetermined degree of surface roughness, and the degree of roughness of the inner-peripheral face 29a is thereby adjusted.

After the second molding step, the cutting head structure is heated by performing the sinter bonding process, the cutting head structure is sintered, and the cutting head body 20 is obtained.

As a result, the degree of roughness of the inner-peripheral face 29a which is finally obtained, that is, the surface roughness in maximum height Rz of the inner-peripheral face 29a is 5 μm to 200 μm.

As described above, in the method for manufacturing the cutting head body 20, in terms of the degree of roughness (second degree of roughness) of the inner-peripheral face 29a which is finally obtained in the sinter bonding process, the degree of roughness (first degree of roughness) of the inner-peripheral face 29a is preliminarily adjusted in the second molding step.

That is, in the second molding step, the cutting head structure is machined so that the surface of the inner-peripheral face 29a has a predetermined degree of roughness (first degree of roughness); thereafter, the cutting head structure obtained in the second molding step is sintered, and the cutting head body 20 in which the inner-peripheral face 29a having the second degree of roughness is formed is thereby manufactured.

In this case, a final surface roughness of the inner-peripheral face 29a is determined depending on molding conditions in the second molding step and sintering conditions in the sinter bonding process.

In addition, the cutting head body 20 may be manufactured without machining the surface of the inner-peripheral face 29a in the second molding step. In this case, in the cutting head structure, the inner-peripheral face 29a having the first degree of roughness is obtained in the first molding step. The cutting head structure in which the surface of the inner-peripheral face 29a is not machined in the second molding step is sintered. In this case, a final surface roughness of the inner-peripheral face 29a is determined depending on the molding conditions of the first molding step and the sintering conditions of the sinter bonding process.

Next, a case where the surface roughness in maximum height Rz of the inner-peripheral face of the engaging hole 29 was adjusted to 7.0 μm and the surface roughness in maximum height Rz of the outer periphery 33a of the shaft portion 33 of the connection member 30 was adjusted to 2.0 μm will be described.

After the connection member 30 was connected with the cutting head body 20 in a above-described manner, the cutting head body 20 was broken down, and the connection member 30 was retrieved. Next, a value of the surface roughness in maximum height Rz of the outer periphery 33a of the shaft portion 33 was measured, and it is confirmed that the surface roughness in maximum height Rz thereof is changed to 5.5 μm.

As a result, it is seen that the outer periphery 33a of the shaft portion 33 of the connection member 30 was plastically-deformed along the inner-peripheral face of the engaging hole 29 so as to have the above-described surface roughness in maximum height Rz.

The above-described Rz is the surface roughness in maximum height defined under JIS B 0601:2001 (ISO 4287:1997) and is a measurement result under the evaluation condition in which reference length is 0.8 mm, cut-off value λs is 0.0025 mm, and λc is 0.8 mm.

In addition, in the embodiment, the inner-peripheral face 29a of the engaging hole 29 is formed as a circular cylinder whose center is the center line O; however, the present invention is not limited to being a circular cylinder, the engaging hole 29 may be formed as a cylinder having a planar wall face parallel to the center line O.

Even if the foregoing structure is employed, when the shaft portion 33 is plastically-deformed so as to increase the diameter thereof, the outer periphery 33a of the shaft portion 33 is attached firmly to the above-described planar wall face, the outer periphery 33a is deformed along the wall face, and a recessed portion is formed at the outer periphery 33a.

In this way, a wall section facing toward the circumferential direction is formed in the recessed portion, and the connection member 30 is thereby prevented from being rotated around the center line O relative to the cutting head body 20.

Therefore, it is possible to reliably connect the cutting head body 20 with the connection member 30.

Furthermore, in the above-described embodiment, the structure in which a female screw is provided at the mounting screw section 14 of the tool body 10 and a male screw is provided at the head screw section 31 of the cutting head body 20 is described; however, the present invention is not limited to this structure.

A structure including, for example, a bolt having a male screw which serves as the mounting screw section 14, and a connection member 30 in which a female screw is provided at the large-diameter hole 34b of the through hole 34 may be adopted.

In this case, the bolt is inserted into a through hole formed at the tool body 10, and the female screw provided at the large-diameter hole 34b is screwed with the male screw provided at the bolt.

However, in the structure, there is a concern that it is difficult for coolant to supply to the flutes 22.

As a result, in a manner similar to the structure of the above-described embodiments, it is desirable that the structure in which a female screw is provided at the mounting screw section 14 of the tool body 10 and a male screw is provided at the head screw section 31 of the connection member 30 be employed.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An exchangeable cutting head to be attached removably to a tool body by being inserted into a mounting hole formed in the tool body and screwed on a mounting screw section provided on a bottom portion of the mounting hole, the exchangeable cutting head comprising:
   a cutting head body comprising: a cutting portion provided at a front-end section; a mounting portion provided at a rear-end section and inserted into the mounting hole; and an engaging hole having an inner-peripheral face on which an uneven face is formed, the cutting head body being made of a hard material; and
   a connection member comprising: a shaft portion that is inserted into the engaging hole, includes an outer periphery attached firmly to the inner-peripheral face of the engaging hole, and is engaged with the inner-peripheral face; a head screw section screwed with the mounting screw section; and a hole section formed inside of the head screw section and the shaft portion and along a center line of the shaft portion, the connection member being made of a plastically-deformable metal material having a degree of hardness lower than a degree of hardness of the hard material and the connection member being connected to the cutting head body; wherein
   at least part of the outer periphery of the shaft portion is plastically-deformed along the uneven face.

2. The exchangeable cutting head according to claim 1, wherein
surface roughness in maximum height Rz of the uneven face is 5 μm to 200 μm, the outer periphery of the shaft portion is attached firmly to the inner-peripheral face of the engaging hole.

3. The exchangeable cutting head according to claim 1, wherein
a recessed portion is formed on the inner-peripheral face, and
at least one of a wall section that faces the front-end section and a wall section that faces in a circumferential direction around the center line is formed at the recessed portion.

4. The exchangeable cutting head according to claim 3, wherein the recessed portion is rounded.

5. The exchangeable cutting head according to claim 3, wherein,
a planar wall face extending in the center line direction is formed at the engaging hole, and the wall face is the wall section that faces in a circumferential direction around the center line in the recessed portion.

6. The exchangeable cutting head according to claim 1, wherein
the mounting portion has an outer-peripheral face,
the mounting hole of the tool body is a tapered hole, and
the outer-peripheral face is tapered such that an external diameter thereof gradually decreases toward the rear-end section and has a taper surface onto which the tapered hole is fitted.

7. The exchangeable cutting head according to claim 6, wherein
an inclined angle of the taper surface relative to the center line is set in the range of 1° to 20°.

8. The exchangeable cutting head according to claim 1, wherein
the hole section is a through hole penetrating the connection member along the center line, and the cutting head body has a coolant hole that communicates with the through hole and opens at the cutting portion.

9. The exchangeable cutting head according to claim 1, wherein
the cutting head body includes a rotation section having at least a pair of parallel faces that are parallel to each other relative to the center line.

10. The exchangeable cutting head according to claim 9, wherein
the rotation section has a rear-end, and a flange that protrudes a radial-outer direction around the center line is provided at the rear-end of the rotation section.

11. The exchangeable cutting head according to claim 1 wherein
the mounting portion has a rear-end, and the engaging hole extends from the rear-end of the mounting portion to inside of the cutting portion.

12. The exchangeable cutting head according to claim 1, wherein
the cutting head body is molded by use of any material of cemented carbide, cermet, and ceramic.

13. A cutting tool having an exchangeable cutting head comprising:
a tool body; and
the exchangeable cutting head according to claim 1 that is attached to the tool body.

* * * * *